(12) United States Patent
Abraham et al.

(10) Patent No.: US 12,556,998 B2
(45) Date of Patent: Feb. 17, 2026

(54) METHODS FOR PERFORMING LOWER LAYER TRIGGERED MOBILITY IN WIRELESS NETWORK

(71) Applicant: SAMSUNG ELECTRONICS CO., LTD., Suwon-si (KR)

(72) Inventors: Aby Kanneath Abraham, Bangalore (IN); Vinay Kumar Shrivastava, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/496,707

(22) Filed: Oct. 27, 2023

(65) Prior Publication Data

US 2024/0147334 A1    May 2, 2024

(30) Foreign Application Priority Data

Oct. 28, 2022  (IN) .............................. 202241061544
Nov. 3, 2022   (IN) .............................. 202241062819
Oct. 7, 2023   (IN) .............................. 202241061544

(51) Int. Cl.
  *H04W 36/32*  (2009.01)
  *H04W 36/00*  (2009.01)
  (Continued)

(52) U.S. Cl.
  CPC ....... *H04W 36/32* (2013.01); *H04W 36/0058* (2018.08); *H04W 76/20* (2018.02); *H04W 76/30* (2018.02)

(58) Field of Classification Search
  None
  See application file for complete search history.

(56) References Cited

U.S. PATENT DOCUMENTS

2019/0306910 A1  10/2019  da Silva et al.
2023/0388871 A1* 11/2023  Guo .................. H04W 36/0069
(Continued)

FOREIGN PATENT DOCUMENTS

WO    2022205034 A1   10/2022

OTHER PUBLICATIONS

International Search Report and Written Opinion of the International Searching Authority dated Jan. 30, 2024, in connection with International Application No. PCT/KR2023/016960, 7 pages.
(Continued)

*Primary Examiner* — Faiyazkhan Ghafoerkhan

(57) ABSTRACT

The disclosure relates to a 5G or 6G communication system for supporting a higher data transmission rate. Embodiments herein disclose methods for performing LTM. The method includes: receiving a LTM configuration in a RRC message indicating whether the UE needs to perform one of: a RLC reestablishment and a PDCP recovery during the LTM to a candidate cell; receiving one of a DL MAC CE or a DL L1 message used for triggering the LTM; performing a MAC operation comprising one of a complete MAC reset and a partial MAC reset; transmitting at least one uplink RRC message, wherein at least one uplink RRC message was transmitted within a specificized time interval before receiving the DL MAC CE or the DL L1 message; and performing at least one of the RLC reestablishment and the PDCP recovery based on the received indication.

18 Claims, 15 Drawing Sheets

(51) Int. Cl.
*H04W 76/20* (2018.01)
*H04W 76/30* (2018.01)

(56) References Cited

U.S. PATENT DOCUMENTS

| | | | |
|---|---|---|---|
| 2023/0413139 A1* | 12/2023 | Xu | H04L 5/0094 |
| 2023/0422123 A1* | 12/2023 | Zhang | H04W 36/18 |
| 2024/0049085 A1* | 2/2024 | Tseng | H04W 36/0055 |
| 2024/0114403 A1* | 4/2024 | Latheef | H04W 36/0061 |
| 2024/0114406 A1* | 4/2024 | Zhou | H04W 36/0055 |
| 2024/0147334 A1* | 5/2024 | Abraham | H04W 36/0058 |
| 2025/0071639 A1* | 2/2025 | Hong | H04W 36/00835 |
| 2025/0071647 A1* | 2/2025 | Hong | H04W 36/08 |
| 2025/0071648 A1* | 2/2025 | Hong | H04W 36/0055 |
| 2025/0088926 A1* | 3/2025 | Hong | H04W 36/0055 |

OTHER PUBLICATIONS

CATT, "Discussion on RRC Configuration for L1L2 Mobility", R2-2209395, 3GPP TSG RAN WG2 Meeting #119bis-e, Sep. 2022, 6 pages.

Futurewei, "Dynamic RRC pre-configuration for L1/L2 mobility", R2-2209723, 3GPP TSG RAN WG2 Meeting #119bis-e, Sep. 2022, 5 pages.

Ericsson, "[Post119-e][048][feMob] Candidate target configurations for L1/L2 mobility", R2-2210329, 3GPP TSG RAN WG2 Meeting #119bis-e, Sep. 2022, 35 pages.

InterDigital, Inc., "RRC Support for L1/2 Triggered Handover", R2-2210193, 3GPP TSG RAN WG2 Meeting #119bis-e, Sep. 2022, 7 pages.

3GPP TS 38.321 V17.2.0 (Sep. 2022) Technical Specification 3rd Generation Partnership Project; Technical Specification Group Radio Access Network; NR; Medium Access Control (MAC) protocol specification (Release 17); 246 pages.

3GPP TS 38.331 V17.2.0 (Sep. 2022) Technical Specification; 3rd Generation Partnership Project; Technical Specification Group Radio Access Network; NR; Radio Resource Control (RRC) protocol specification (Release 17); 1277 pages.

Examination report issued Jul. 28, 2025, in connection with Indian Patent Application No. 202241061544, 8 pages.

Supplementary European Search Report dated Dec. 11, 2025, in connection with European Patent Application No. 23883193.7, 12 pages.

Ericsson, "Configuration of candidate target cells for L1/L2 based inter-cell mobility," 3GPP TSG-RAN WG2 #119-e, Electronic meeting, Aug. 2022, R2-2208199, 5 pages.

* cited by examiner

METHODS FOR PERFORMING LOWER LAYER TRIGGERED MOBILITY IN WIRELESS NETWORK

CROSS REFERENCE TO RELATED APPLICATIONS

This application is based on and derives the benefit of Indian Provisional Application 202241061544 filed on Oct. 28, 2022, and Indian Provisional Application 202241062819 filed on Nov. 3, 2022, and Indian Non-Provisional Application 202241061544 filed on Oct. 7, 2023, the contents of which are incorporated herein by reference.

BACKGROUND

1. Field

Embodiments disclosed herein relate to wireless communication networks (or wireless networks), and more particularly to methods, a user equipment (UE), and a network entity for managing mobility (e.g., lower layer triggered mobility (LTM) or the like) in the wireless communication networks.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In wireless technologies like fifth generation new radio (5G NR), devices (e.g., smart phone or the like) can move across different cells. Mobility is performed using a procedure called cell reselection in a radio resource control idle (RRC_IDLE) mode. Till NR R17, mobility was performed using a procedure called handover in a RRC_CONNECTED mode. A network controlled mobility applies to UEs in the RRC_CONNECTED. The network controlled mobility requires explicit radio resource control (RRC) signalling to be triggered by a gNB in the NR. A handover in the NR usually comprises of three steps such as handover preparation step, handover execution step and handover completion step. The gNB may configure the UE to report measurements and based on the reported measurements or based on its own understanding of the network topology, the gNB may send a RRC reconfiguration message to handover the UE to another cell (hereinafter referred to as a target cell) from a source cell. The UE accesses the target cell and sends a RRC reconfiguration complete message.

In another solution introduced in 3GPP NR release 16, the gNB may configure the UE with the execution conditions for triggering handover. Once the execution conditions are satisfied, the UE may move to the target cell and send the RRC reconfiguration complete message.

In all these methods, the UE performs handover by sending layer 3 (RRC) messages which causes considerable signalling overhead and latency issues. 3GPP specifications such as TS38.300, TS38.331, TS 38.321 are also considered herein as relevant background.

The 3GPP release 18 is considering using Lower layers (e.g., L1/L2 layers) triggered mobility (also known as LTM) to solve this problem. As per 3GPP, the goal of LTM is to enable a serving cell change via L1/L2 signalling, in order to reduce the latency, overhead and interruption time. The network (e.g., gNB or the like) may configure the UE with multiple candidate cells to allow fast application of configurations for candidate cells. The network may further send a medium access control control-element (MAC CE) or L1 signalling to dynamically switch the UE from the source cell to one of the configured candidate cells. Further, the LTM can be triggered based on L1 measurements rather than L3 measurements. Thus, the LTM is a mobility (i.e., handover) which is based on the lower layer measurements and/or the lower layer triggers.

The 3GPP provides to perform LTM, without reset of lower layers (like MAC) to avoid data loss and to reduce the additional delay of data recovery, wherever it is possible. The gNB may configure a LTM candidate cell through one RRCReconfiguration message for candidate target cell or through one CellGroupConfig for each candidate target cell. The gNB may further release or modify the candidate configurations.

It is desired to address the above mentioned disadvantages or other short comings or at least provide a useful alternative.

The principal object of the embodiments herein is to disclose methods for configuring user equipment's (UEs) for a LTM in a wireless network (e.g., 5G network or the like).

Another object of the embodiments herein is to configure a LTM candidate cell.

Another object of the embodiments herein is to release the LTM candidate cell.

Another object of the embodiments herein is to configure a LTM reference configuration.

Another object of the embodiments herein is to configure LTM measurements.

Another object of the embodiments herein is to complete the LTM through a RRC reconfiguration message.

Another object of the embodiments herein is to configure a L3 measurement configuration and a radio bearer configuration during the LTM.

Another object of the embodiments herein is to configure a timer for a LTM failure handling and one or more action(s) for handling the LTM failure.

Another object of the embodiments herein is to handle a LTM and RRC reestablishment/Resume.

Another object of the embodiments herein is to store LTM configurations after subsequent LTM.

Another object of the embodiments herein is to handle a L2 reset during cell switch.

Another object of the embodiments herein is to perform LTM in a NR in which the UE performs subsequent LTMs when cell switch between L1/L2 mobility candidates is done without RRC reconfiguration in between.

Another object of the embodiments herein is to perform LTM in the NR, where the UE is instructed on how to perform layer2 resets (e.g., MAC reset/RLC recovery/packet data convergence protocol (PDCP) reestablishment/service data adaptation protocol (SDAP) reset) during the LTM.

Another object of the embodiments herein is to perform the LTM in the NR, where the UE performs cancellation of MAC procedures and MAC counter resets during LTM.

Another object of the embodiments herein is to handle a transmission of a UEAssistanceInformation (UAI), a MBSInterestIndication and a SidelinkUEInformationNR during the LTM.

SUMMARY

Accordingly, the embodiments herein provide methods for performing LTM in a wireless network. The method includes receiving, by a UE, a LTM configuration in a radio resource control (RRC) message indicating whether the UE needs to perform one of: a radio link control (RLC) reestablishment and a packet data convergence protocol (PDCP) recovery during the LTM to a candidate cell. Further, the method includes receiving, by the UE, one of: a DL MAC CE or a DL L1 message used for triggering the LTM. Further, the method includes performing, by the UE, a medium access control (MAC) operation comprising one of: a complete MAC reset and a partial MAC reset. Further, the method includes transmitting, by the UE, at least one uplink RRC message, where at least one uplink RRC message was transmitted within a specificized time interval before receiving the DL MAC CE or the DL L1 message. Further, the method includes performing, by the UE, at least one of: the RLC reestablishment and the PDCP recovery based on the received indication. Further, the method includes retransmitting, by the UE, the uplink RRC message.

Accordingly, the embodiments herein provide methods for performing a LTM in a wireless network. The method includes receiving, by a UE, a trigger of a LTM from a network entity. Further, the method includes performing, by the UE, at least one operation based on the trigger, where the at least one operation includes at least one of: an UL MAC procedure, resets all counters of a beam failure indication, a listen before transmission during the LTM, and cancel a procedure for triggering a BSR for an XR. The at least one UL MAC procedure includes at least one of: a triggered scheduling request procedure, a triggered buffer status reporting procedure, a triggered power headroom reporting procedure, a triggered consistent listen before transmit (LBT) failure, a triggered beam failure recovery (BFR), a triggered side-link buffer status reporting procedure, a triggered pre-emptive buffer status reporting procedure, a triggered timing advance reporting procedure, a triggered recommended bit rate query procedure, a triggered configured uplink grant confirmation, a triggered configured side-link grant confirmation, a triggered desired guard symbol query, a triggered positioning measurement gap activation request procedure, a triggered positioning measurement gap deactivation request procedure, and a triggered small data transmission (SDT) procedure.

Accordingly, the embodiments herein provide methods for performing a LTM in a wireless network. The method includes generating, by a network entity, a LTM configuration. Further, the method includes indicating, by the network entity, one of: whether a UE needs to perform a RLC reestablishment and a PDCP recovery during a LTM to a candidate cell, and whether the UE needs to trigger a RLC re-establishment during execution of LTM based on a flag indication. Further, the method includes trigger a LTM based on the flag indication.

Accordingly, the embodiments herein provide a UE including a LTM controller coupled with a processor and a memory. The LTM controller is configured to receive a LTM configuration in a RRC message indicating whether the UE needs to perform one of: a RLC reestablishment and a PDCP recovery during the LTM to a candidate cell. Further, the LTM controller is configured to receive a DL MAC CE or a DL L1 message used for triggering the LTM. Further, the LTM controller is configured to perform a MAC operation comprising one of: a complete MAC reset and a partial MAC reset. Further, the LTM controller is configured to transmit at least one uplink RRC message, where at least one uplink RRC message was transmitted within a specificized time interval before receiving DL MAC CE or DL L1 message. Further, the LTM controller is configured to perform the RLC reestablishment or the PDCP recovery based on the received indication. Further, the LTM controller is configured to retransmit the uplink RRC message.

Accordingly, the embodiments herein provide a UE including a LTM controller coupled with a processor and a memory. The LTM controller is configured to receive a trigger of a LTM from a network entity. Further, the LTM controller is configured to perform at least one operation. The at least one operation includes at least one of: an UL MAC procedure, resets all counters of a beam failure indication or a listen before transmission during the LTM, and cancel a procedure for triggering a BSR for extended reality (XR). The at least one UL MAC procedure includes at least one of: a triggered scheduling request procedure, a triggered buffer status reporting procedure, a triggered power headroom reporting procedure, a triggered consistent LBT, triggered BFR, a triggered side-link buffer status reporting procedure, a triggered pre-emptive buffer status reporting procedure, a triggered timing advance reporting procedure, a triggered recommended bit rate query procedure, a triggered configured uplink grant confirmation, a triggered configured side-link grant confirmation, a triggered desired guard symbol query, a triggered positioning measurement gap activation request procedure, a triggered positioning measurement gap deactivation request procedure, and a triggered SDT procedure.

Accordingly, the embodiments herein provide a network entity including a LTM controller coupled with a processor and a memory. The LTM controller is configured to generate a LTM configuration from a network entity in the wireless network. Further, the LTM controller is configured to indicate one of: whether a UE needs to perform a RLC reestablishment and a PDCP recovery during a LTM to a candidate cell, and whether the UE needs to trigger a RLC re-establishment during execution of LTM based on a flag indication. Further, the LTM controller is configured to trigger the LTM based on the flag indication.

Accordingly, the embodiments herein provide methods for performing a LTM in a wireless network. The method includes sending, by a network entity, a RRCReconfiguration message comprising a list of LTM candidate configurations to be added or modified, a list of LTM candidate configuration to be released, a measurement configuration for the LTM, and a reference configuration information. Further, the method includes receiving, by the network entity, a layer 1 measurements based on the (configurations in the) RRCReconfiguration message. Further, the method includes sending, by the network entity, a MAC CE to switch the UE from a source cell to a candidate cell upon receiving the layer 1 measurements.

Accordingly, the embodiments herein provide methods for performing a LTM in a wireless network. The method includes receiving, by a UE, a RRCReconfiguration message comprising a list of LTM candidate configurations to be added or modified, a list of LTM candidate configuration to be released, a measurement configuration for the LTM, and a reference configuration information from a network entity. Further, the method includes receiving, by the UE, a MAC CE from the network entity to switch the UE from a source cell to a candidate cell based on the RRCReconfiguration message.

Accordingly, the embodiments herein provide methods for performing a LTM in a wireless network. The method includes configuring, by a UE, a flag that indicates whether the UE performs a LTM to complete the LTM or the UE sends a RRCReestablishment during failure. Further, the method includes configuring, by the UE, a first timer for performing an access on a first target candidate cell. Further, the method includes determining, by the UE, an expiry of the first timer, while trying to access the first target candidate cell for completing the LTM. Further, the method includes detecting, by the UE, that a RLF has occurred in the UE based on the determination. Further, the method includes attempting to select, by the UE, a suitable cell for a duration of a second timer and selecting a cell within a second timer value upon determining that the selected cell is the second target candidate cell. Further, the method includes performing, by the UE, one of based on the flag, initiating a RRC reestablishment procedure to access the second target candidate cell and indicating in RRCRestablishment message that LTM has failed, and completing the LTM by sending RRCReconfigurationComplete.

Accordingly, the embodiments herein provide methods for performing a LTM in a wireless network. The method includes performing, by the UE, a cell selection while a timer is running. Further, the method includes removing, by the UE, a configuration for the LTM, where the configuration includes a candidate cell configuration or a measurement configuration for the LTM during a RRC reestablishment procedure.

Accordingly, the embodiments herein provide methods for performing a LTM in a wireless network. The method includes performing, by a UE, one of: receiving a RRC Release message and transitioning to RRC_IDLE, or receiving a RRC Release with suspend config and transitioning to RRC_INACTIVE, or initiating a RRCReestablishment and completing cell selection while timer T311 is running. Further, the method includes releasing, by the UE, a configuration for LTM upon receiving one of: the RRC Release and the RRC Release with suspend config or upon initiating a RRCReestablishment or following cell selection while timer T311 is running.

Accordingly, the embodiments herein provide a network entity including a LTM controller coupled with a processor and a memory. The LTM controller is configured to send a RRCReconfiguration message comprising a list of LTM candidate configurations to be added or modified, a list of LTM candidate configuration to be released, a measurement configuration for the LTM, and a reference configuration information. Further, the LTM controller is configured to receive a layer 1 measurements based on the RRCReconfiguration message. Further, the LTM controller is configured to send a MAC CE to switch the UE from a source cell to a candidate cell upon receiving the layer 1 measurements.

Accordingly, the embodiments herein provide a UE including a LTM controller coupled with a processor and a memory. The LTM controller is configured to receive a RRCReconfiguration message comprising a list of LTM candidate configurations to be added or modified, a list of LTM candidate configuration to be released, a measurement configuration for the LTM, and a reference configuration information from a network entity. Further, the LTM controller is configured to receive a MAC CE from the network entity to switch the UE from a source cell to a candidate cell based on the RRCReconfiguration message.

Accordingly, the embodiments herein provide a UE including a LTM controller coupled with a processor and a memory. The LTM controller is configured to configure a flag that indicates whether the UE performs a LTM to complete the LTM or the UE sends a RRCReestablishment during failure. Further, the LTM controller is configured to configure a first timer for performing an access on a first target candidate cell. Further, the LTM controller is configured to determine an expiry of the first timer, while trying to access the first target candidate cell for completing the LTM. Further, the LTM controller is configured to detect that a radio link failure (RLF) has occurred in the UE based on the determination. Further, the LTM controller is configured to attempt to select, by the UE, a suitable cell for a duration of a second timer and selecting a cell within a second timer value upon determining that the selected cell is a second target candidate cell. In an embodiment, the LTM controller is configured to initiate a RRC reestablishment procedure to access the second target candidate cell and indicate in RRCRestablishment message that the LTM has failed based on the flag. In another embodiment, the LTM controller is configured to complete the LTM by sending a RRCReconfigurationComplete based on the flag.

Accordingly, the embodiments herein provide a UE including a LTM controller coupled with a processor and a memory. The LTM controller is configured to perform a cell selection while a timer is running in a RRC reestablishment procedure. Further, the LTM controller is configured to remove a configuration for the LTM, where the configuration includes a candidate cell configuration or a measurement configuration for the LTM during the RRC reestablishment procedure.

Accordingly, the embodiments herein provide a UE including a LTM controller coupled with a processor and a memory. The LTM controller is configured to perform one of: receiving a RRC Release message and transitioning to RRC_IDLE, or receiving a RRC Release with suspend config and transitioning to RRC_INACTIVE, or initiating a RRCReestablishment and completing cell selection while timer T311 is running. Further, the LTM controller is configured to release a configuration for LTM upon receiving one of: the RRC Release and the RRC Release with suspend config or upon initiating a RRCReestablishment or following cell selection while timer T311 is running.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
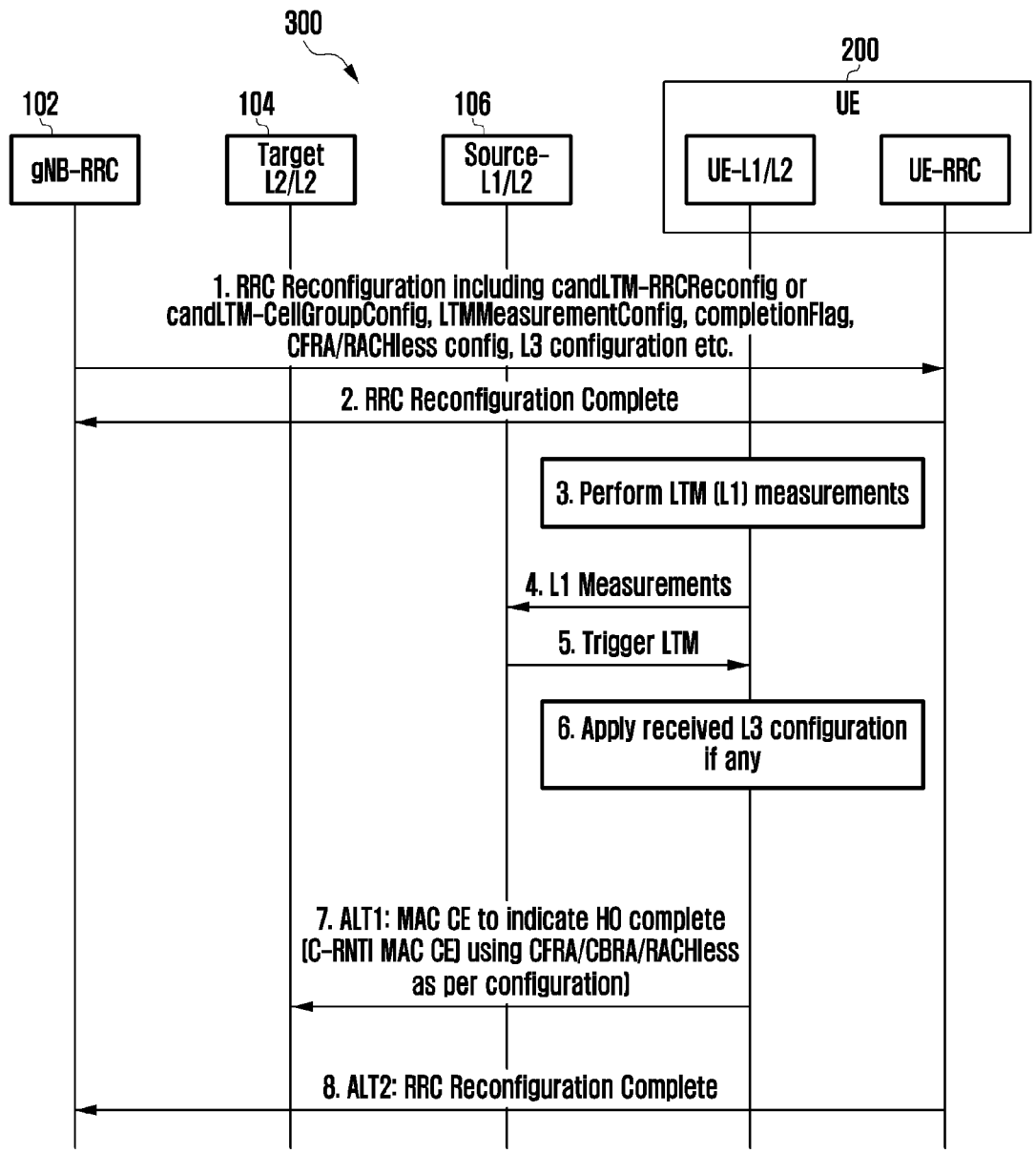
FIG. 1 illustrates a sequence diagram of a LTM configuration and completion process according to embodiments as disclosed herein.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

For the purposes of interpreting this specification, the definitions (as defined herein) will apply and whenever appropriate the terms used in singular will also include the plural and vice versa. It is to be understood that the terminology used herein is for the purposes of describing particular embodiments only and is not intended to be limiting. The terms "comprising," "having" and "including" are to be construed as open-ended terms unless otherwise noted.

The words/phrases "exemplary," "example," "illustration," "in an instance," "and the like," "and so on," "etc.," "etcetera," "e.g.," "i.e.," are merely used herein to mean "serving as an example, instance, or illustration." Any embodiment or implementation of the present subject matter described herein using the words/phrases "exemplary," "example," "illustration," "in an instance," "and the like," "and so on," "etc.," "etcetera," "e.g.," "i.e.," is not necessarily to be construed as preferred or advantageous over other embodiments.

Embodiments herein may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

It should be noted that elements in the drawings are illustrated for the purposes of this description and ease of understanding and may not have necessarily been drawn to scale. For example, the flowcharts/sequence diagrams illustrate the method in terms of the steps required for understanding of aspects of the embodiments as disclosed herein. Furthermore, in terms of the construction of the device, one or more components of the device may have been represented in the drawings by conventional symbols, and the drawings may show only those specific details that are pertinent to understanding the present embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show only those specific details that are pertinent to understanding the present embodiments so as not to obscure the drawings with details that will be readily apparent to those of ordinary skill in the art having the benefit of the description herein.

The accompanying drawings are used to help easily understand various technical features and it should be understood that the embodiments presented herein are not limited by the accompanying drawings. As such, the present disclosure should be construed to extend to any modifications, equivalents, and substitutes in addition to those which are particularly set out in the accompanying drawings and the corresponding description. Usage of words such as first, second, third etc., to describe components/elements/steps is for the purposes of this description and should not be construed as sequential ordering/placement/occurrence unless specified otherwise.

The embodiments herein achieve methods for performing a LTM in a wireless network. The method includes sending, by a network entity, a RRCReconfiguration message comprising a list of LTM candidate configurations to be added or modified, a list of LTM candidate configuration to be released, a measurement configuration for the LTM, and a reference configuration information. Further, the method includes receiving, by the network entity, a layer 1 measurements based on the RRCReconfiguration message. Further, the method includes sending, by the network entity, a MAC CE to switch the UE from a source cell to a candidate cell upon receiving the layer 1 measurements.

The provided method can be used to avoid data loss and reduce the delay of data recovery in the wireless network.

Referring now to the drawings, and more particularly to FIGS. 1 through 15, where similar reference characters denote corresponding features consistently throughout the figures, there are shown at least one embodiment.

FIG. 1 illustrates a sequence diagram of a LTM configuration and completion process in a wireless network (300) according to embodiments as disclosed herein. The wireless network (300) can be, for example, but not limited a 5G network, a sixth generation (6G) network, an open radio access network (ORAN) or the like. A source gNB provides a RRCReconfiguration message or a candidate cell Cellgroupconfig message per candidate cell for a LTM. Embodiments herein refer to the candidate cell RRC reconfiguration as candLTM-Reconfiguration and the candidate cell cellgroupconfig as candLTM-CellGroup.

An example signaling where the candidate cell reconfiguration is provided as shown in TABLE 1.

TABLE 1

```
RRCReconfiguration-v18xx-Ies ::= SEQUENCE {
    candLTM-Reconfiguration      SEQUENCE      CandLTM-Reconfiguration
    OPTIONAL,
    ITMMeasConfig              LTMMeasConfig OPTIONAL,
    nonCriticalExtension RRCReconfiguration-v1xxx-Ies
    OPTIONAL,
    refConfigId         RefConfigId
    OPTIONAL,
}
CandLTM-Reconfiguration ::= SEQUENCE {
    candLTM-ReconfigToRemoveList        CandLTM-ReconfigToRemoveList
    OPTIONAL, -- Need N
    candLTM-ReconfigToAddModList        CandLTM-ReconfigToAddModList
    OPTIONAL, -- Need N
    ...
}
CandLTM-ToAddModList ::= SEQUENCE (SIZE (1.. maxNr)) OF CandLTM-
ToAddMod
CandLTM-ToAddMod ::= SEQUENCE {
    candLTM-ReconfigId,
    candLTM-RRCReconfig       OCTET     STRING     (CONTAINING
    RRCReconfiguration) OPTIONAL,
    refConfigId         RefConfigId OPTIONAL,
}
```

In an embodiment, the candidate cell can be reconfigured using candLTM-CellGroupConfig. This reconfiguration procedure is given below in TABLE 2.

TABLE 2

```
RRCReconfiguration-v18xx-Ies ::= SEQUENCE {
    candLTM-CellGroupConfig    OPTIONAL,
    ITMMeasConfig              LTMMeasConfig OPTIONAL,
    refConfigId                RefConfigId OPTIONAL,
    lateNonCriticalExtension OCTET STRING      OPTIONAL,
}
CandLTM-CellGroupConfig ::= SEQUENCE {
    candLTM-CellGroupConfig    ToRemoveList      CandLTM-    CellGroupConfig
    ToRemoveList OPTIONAL, -- Need N
    candLTM-CellGroupConfig    ToAddModList      CandLTM-    CellGroupConfig
    ToAddModList OPTIONAL, -- Need N
    ...
}
CandLTM-ToAddModList ::= SEQUENCE (SIZE (1.. maxNr)) OF CandLTM-
ToAddMod
CandLTM-ToAddMod ::= SEQUENCE {
    candLTM-CellGroupConfigId CandLTM-CellGroupConfig Id,
    candLTM-CellGroupConfig OCTET     STRING     (CONTAINING
    CellGroupConfig) OPTIONAL,
    refConfigId         RefConfigId OPTIONAL,
}
```

In an embodiment, the gNB instructs the UE (200) to release the candidateLTM configuration and the UE (200) releases the candidateLTM configuration accordingly. The UE (200) can be, for example, but not limited to a laptop, a smart phone, a desktop computer, a notebook, a Device-to-Device (D2D) device, a vehicle to everything (V2X) device, a foldable phone, a smart TV, a tablet, an immersive device, and an internet of things (IoT) device. The gNB sends a candLTM-CellGroupConfigToRemoveList (containing a list of candLTM-CellGroupConfigId) or candLTM-Reconfig-ToRemoveList (containing list of candLTM-ReconfigId) and the UE (200) removes all the candidateLTM configurations identified by any candLTM-CellGroupConfigId in a candLTM-CellGroupConfigToRemoveList or identified by any candLTM-ReconfigId in the candLTM-Reconfig-ToRemoveList.

In an embodiment, the gNB can indicate whether the candidateLTM-CellGroupConfig or the CandLTM-Reconfiguration is a full configuration or delta configuration. If it is a delta configuration, the gNB indicates the cellgroupconfig or RRC reconfiguration (for e.g., candLTM-ReconfigId or candLTM-CellGroupConfigId) that can be used as reference configuration (refConfigId). If the CandLTM-Reconfiguration is the full configuration, the configuration includes all the configurations needed by the UE (200) at the time of configuration. The UE (200) can directly apply the full configuration. If the CandLTM-Reconfiguration is the delta LTM configuration, the delta LTM configuration may contain only a part of the configuration required for the UE (200) and the UE (200) combines the delta LTM configuration with the reference configuration to generate full configuration which could be applied.

If the gNB indicates to use delta configuration and does not provide candLTM-ReconfigId or the candLTM-CellGroupConfigId, the UE (200) uses a current source cell configuration as reference configuration. In an embodiment, the gNB may indicate to the UE (200) to use a source cell configuration as the reference for delta configuration explicitly in the RRC message.

In an alternate embodiment, the gNB also can provide a OCTETSTRING containing RRC reconfiguration or cellgroupconfig that can be used as reference configuration instead of refConfigId.

In an example, the gNB may configure the UE (200) with CandLTM-Reconfiguration including candLTM-RRCReconfig with candLTM-ReconfigId as 1, 2 and 3. The gNB also indicates that the referenceConfiguration to be used for ltmconfig 2 is 1 (i.e., refConfigId=1). The gNB provides the reference RRC Configuration or cellgroupconfiguration as the deltaconfiguration in reference to 1.

The gNB can also provide L1 measurement configuration, LTMMeasConfig in RRC reconfiguration message to the UE (200) for performing the L1 measurements for the LTM. The LTMMeasConfig can be CSI-RS measurement configuration.

Configuration for contention free RACH (CFRA) and RACH less handover: while configuring the UE (200) with the candidate cell configurations for the LTM in the RRC messages like RRC reconfiguration, the gNB includes the contention free RACH (CFRA) resources for one or more of the candidate cells in Cellgroupconfig IE. The gNB also may include the resources (grants/resource blocks) for sending a UL message (for e.g., UL MAC CE or L1 message) for completing handover without RACH (i.e., for performing RACHless handover) in the RRC messages such as RRC reconfiguration. The candLTM-Reconfiguration or the candLTM-CellGroupConfig, as illustrated earlier can include CFRA configuration and the resources for handover completion.

In an embodiment, the gNB includes only one of the contention free RACH resources or resources for completing handover without RACH in the RRC configuration for a candidate cell (i.e., in candLTM-Reconfiguration or candLTM-CellGroupConfig).

In an embodiment, the UE (200) may receive resources for sending the UL message for completing handover without RACH (i.e., for RACH less handover) in the uplink Medium Access Control Control-Element (UL MAC CE). If the UE (200) receives both the CFRA resources and the UL resources for the LTM (including the case where the UE (200) receives the CFRA resources through the RRC message and resources for RACHless handover through the UL MAC CE or RRC message), the UE (200) performs the handover completion using the UL resources received for RACH less handover. If the UL message for the handover completion could not be successfully transmitted through RACHless handover, the UE (200) may perform CFRA with the configured resources in candLTM-Reconfiguration or candLTM-CellGroupConfig or through contention based RACH. The gNB may provide the UE (200) with a flag if it is allowed to perform RACH when the UL message for handover completion could not be successfully send using MAC or L1 signalling.

LTM completion: In an embodiment, the gNB indicates the UE (200) whether to send a RRC message (for e.g., NR RRC reconfiguration Complete) or a L1/L2 message (for e.g., UL MAC CE), once the handover has been successfully completed (for e.g., through a completionFlag). If the network indicates to the UE (200) to send the UL MAC CE, the handover procedure may be successfully completed once the UE (200) responds to the L1/L2 trigger with the UL MAC CE (such as C-RNTI MAC CE). If the network configures the UE (200) to send RRC message to indicate the completion of the handover, the UE (200) sends the RRC reconfiguration complete message.

Handling of layer 3 configuration during LTM: In an embodiment, the UE (200) can receive a configuration message to add or delete or modify the radio bearers (data radio bearers or signalling radio bearers or MBS bearers and so) on performing the L1L2 mobility from the gNB. The UE (200) can delete/modify the radio bearers on the execution of L1/L2 mobility. The gNB can also add/delete/modify the radio bearers from the gNB's side. The UE (200) receives the configuration to add or delete or modify the radio bearers in the RRC message which configures or modifies the configuration of L1L2 mobility configuration.

In an embodiment, the UE (200) can receive the configuration to add/delete/modify the measurement configuration (including, but not limited to, measurement object configuration, report configuration, measurement identifier configuration, measurement gap configuration, and so on) on performing the L1/L2 mobility from the gNB. The UE (200) adds or deletes or modifies the measurement configuration on the execution of L1/L2 mobility. The gNB can also add/delete/modify the measurement configuration from the gNB's side. The UE (200) receives this configuration in the RRC message which configures or modifies the configuration of L1/L2 mobility configuration.

In an embodiment, the UE (200) can receive the configuration to add/delete/modify the application layer measurement configuration (for e.g., as in appLayerMeasConfig-r17) or any other RRC reconfiguration IEs on performing the L1/L2 mobility from the gNB. The UE (200) adds/deletes/ modifies the application layer measurement configuration and performs actions defined for the IEs during a L3 mobility on the execution of L1/L2 mobility. The gNB can also add/delete/modify the application layer measurement configuration or perform the actions for other RRC reconfiguration IEs on performing L1/L2 mobility from the gNB's side. The UE (200) receives this configuration in RRC message which configures or modifies the configuration of L1/L2 mobility configuration.

L3 configuration during LTM: In an embodiment, while configuring the UE (200) for the LTM, the gNB excludes the configuration to add/delete/modify the measurement configuration (including, but not limited to, measurement object configuration, report configuration, measurement identifier configuration, measurement gap configuration, and so on) in the L3 message that has been send (for e.g., RRC reconfiguration) to configure the UE (200) for the LTM.

In an embodiment, while configuring the UE (200) for the LTM, the gNB excludes the configuration to add/delete/modify the radio bearer configuration ((data radio bearers or signalling radio bearers or MBS bearers etc.) in the L3 message send (for e.g., RRC reconfiguration) to configure the UE (200) for the LTM.

In an embodiment, while configuring the UE (200) for the LTM, the gNB excludes the configuration to add/delete/modify the application layer measurement configuration (for e.g., as in appLayerMeasConfig-r17) in the L3 message send (for e.g., RRC reconfiguration) to configure the UE (200) for the LTM.

As shown in FIG. 1, at step 1, RRC layer (102) of the gNB sends the RRC reconfiguration including candLTM-RRCReconfig or candLTMCellGroupConfig, LTMMeasurementConfig, completionFlag, CFRA/RACHless config, L3 configuration etc., to the RRC layer of the UE (200). At step 2, the RRC of the UE (200) sends the RRC reconfiguration complete to the RRC layer (102) of the gNB. At step 3, L1/L2 of the UE (200) performs LTM (L1) measurements. At step 4, L1/L2 of the UE (200) sends the L1 measurements to the L1/L2 (106) of the Source gNB. At step 5, the L1/L2 (106) of the source gNB triggers LTM by sending a UL MAC CE to the L1/L2 of the UE (200). At step 6, the L1/L2 of the UE (200) applies the received L3 configuration if any. In an embodiment, at 7, the L1/L2 of the UE (200) sends the MAC CE to indicate HO complete (C-RNTI MAC CE) using CFRA/CBRA/RACHless as per configuration to the L1/L2 (104) of the target gNB. In another embodiment, at step 8, the RRC of the UE (200) sends the RRC reconfiguration Complete to the RRC layer (102) of the gNB.

Figure 2:
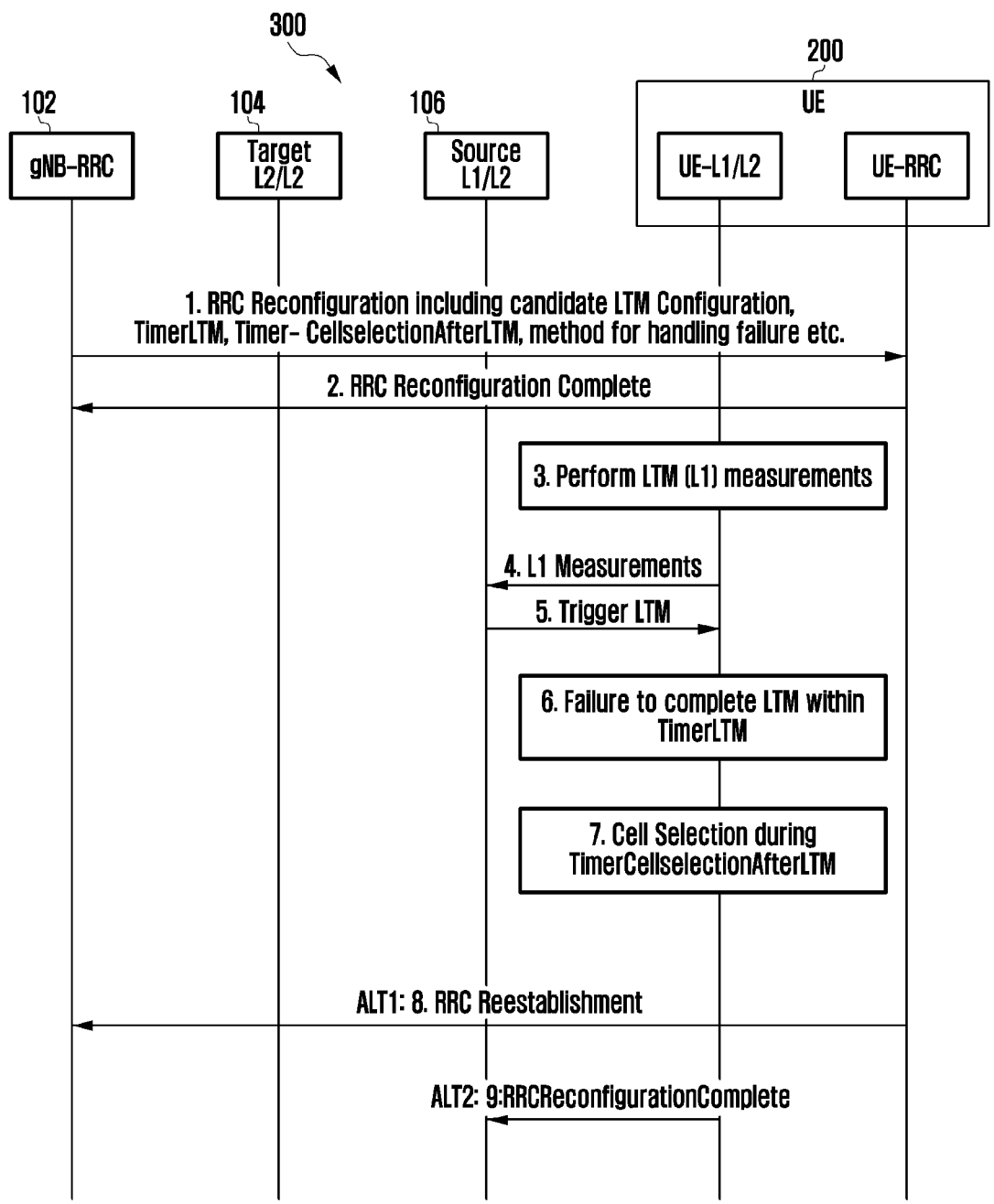
FIG. 2 illustrates a sequence diagram of a process for handling LTM failure according to embodiments as disclosed herein.

FIG. 2 illustrates a sequence diagram of a process for handling LTM failure according to embodiments as disclosed herein. In an embodiment, the UE (200) may be configured with a timer for performing the access on the target candidate cell and on the expiry of the timer (for e.g., Timer-LTM), while trying to access the target candidate for completing LTM, the UE (200) considers a radio link failure has occurred in the UE (200). The UE (200) may attempt to select a new cell for the duration of a specific timer (for e.g., Timer-CellselectionAfterLTM) and if a new cell is selected within a specified timer value, the UE RRC may initiate RRC reestablishment procedure. In an alternate embodiment, the UE (200) can send a UL MAC CE or UL L1 message to indicate that LTM has failed after the new cell is selected.

In an embodiment, the timer TimerLTM is the same timer used for handover (i.e., T304 timer in technical specification (TS) 38.331 V17.2.0). In an embodiment, Timer-CellselectionAfterLTM is the same timer T311 in the TS 38.331 V17.2.0. In an embodiment, TimerLTM is included in candidate cell's LTM configuration, i.e., in one of CandLTM-ToAddMod, candLTM-CellGroupConfig or candLTM-RRCReconfig. In an embodiment, the TimerLTM is included in source cell's RRC reconfiguration (RRCReconfiguration-v18xx-Ies as in earlier embodiment). In an embodiment, Timer-CellselectionAfterLTM is included in candidate cell's LTM configuration, i.e., in one of CandLTM-ToAddMod, candLTM-CellGroupConfig or candLTM-RRCReconfig. In an embodiment, Timer-CellselectionAfterLTM is included in source cell's RRC reconfiguration (RRCreconfiguration-v18xx-Ies as in earlier embodiment).

In an embodiment, on the expiry of this timer Timer-LTM, the UE (200) sends the UL MAC CE to the source gNB to indicate that the LTM has failed. The UE (200) returns to the source cell to send the UL MAC CE, based on a configuration from the network.

In an embodiment, on the expiry of the timer Timer-LTM, the UE (200) performs the cell selection for the duration of the specific timer (for e.g., Timer-CellselectionAfterLTM). If the UE (200) selects a cell which was configured as a candidate cell for LTM, the UE (200) completes the LTM by sending L1/L2/L3 message for completing the handover. In an embodiment, the gNB configures the UE (200) with the flag which indicates whether it can perform LTM to complete the handover or whether the UE (200) may send a L1/L2 message or L3 (RRC reestablishment) message which can also indicate that LTM has failed.

As shown in FIG. 2, at step 1, the RRC layer (102) of the gNB sends the RRC reconfiguration including RRC reconfiguration including candidate LTM Configuration, TimerLTM, Timer-CellselectionAfterLTM, a method for handling failure etc., to the RRC layer of the UE (200). At step 2, the RRC of the UE (200) sends the RRC reconfiguration Complete to the RRC layer (102) of the gNB. At step 3, the L1/L2 of the UE (200) performs the LTM (L1) measurements. At step 4, the L1/L2 of the UE (200) sends the L1 measurements to the L1/L2 (106) of the Source gNB. At step 5, the L1/L2 (106) of the source gNB triggers the LTM by sending the UL MAC CE to the L1/L2 of the UE (200). At step 6, L1/L2 of the UE (200) failures to complete LTM within the TimerLTM. At 7, the UE (200) performs the cell selection during TimerCellselectionAfterLTM. In an embodiment, at 8, the RRC of the UE (200) sends the RRC reestablishment to the gNB-RRC (102). In another embodiment, at step 9, the UE (100) completes the LTM by sending the RRCReconfigurationComplete to the source L1/L2 (106).

Figure 3:
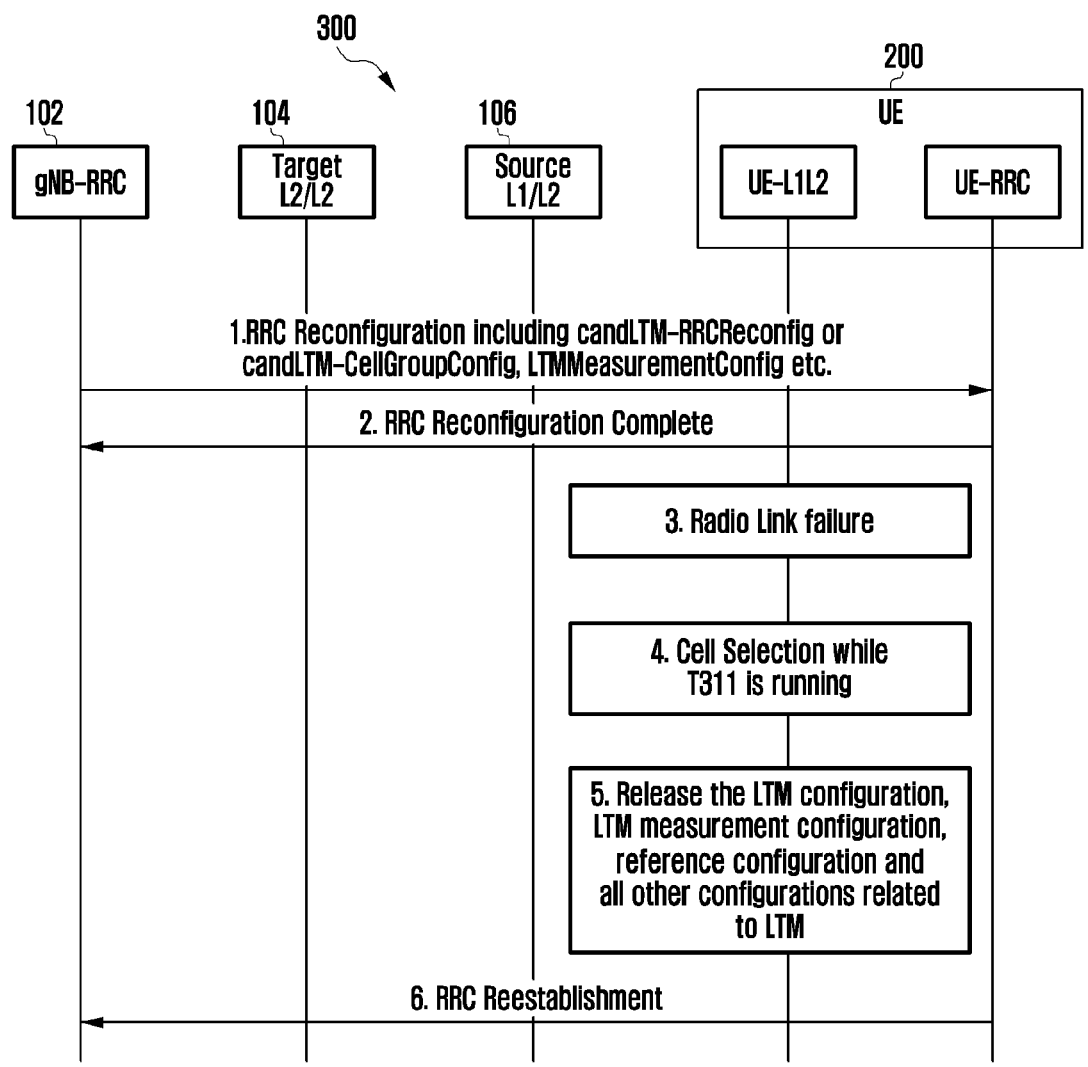
FIG. 3 illustrates a sequence diagram of a process for handling a LTM configuration during a RRC reestablishment according to embodiments as disclosed herein.

FIG. 3 illustrates a sequence diagram of a process for handling the LTM configuration during the RRC reestablishment according to embodiments as disclosed herein. In an embodiment, during the RRC reestablishment procedure, the UE (200) removes any measurement configuration for the LTM. In an embodiment, the removal may be performed following cell selection while the timer T311 is running.

In an embodiment, the UE (200) removes all the configurations, for LTM, including all the candidate cell configurations (configured via candLTM-Reconfiguration or candLTM-CellGroupConfig), during the RRC reestablishment procedure. The RRC reestablishment procedure includes the various steps as detailed in 3gpp TS 38.331 section 5.3.7. This can be performed while T311 is running. Alternatively, it can be performed following cell selection while a radio link failure (RLF) is detected or upon the reception of RRC reestablishment message.

In an embodiment, the UE (200) removes any delta configuration shared with respect to the LTM for any candidate cell during RRC reestablishment procedure. In an embodiment, the UE (200) removes the delta configuration following a cell selection while T311 is running, or alternatively, it can be performed following cell selection, while a RLF is detected or upon the reception of RRC reestablishment.

If the configuration for the LTM is for conditional configuration, the gNB may indicate to the UE (200) to attempt a conditional reconfiguration based on LTM following a cell selection, while the T311 timer is running.

During the reestablishment procedure (as in TS 38.331 section 5.3.7), if the UE (200) selects a cell for which candLTM-RRCReconfig or candLTM-CellGroupConfig is available, the UE (200) may send the LTM completion message (either L3 message or L1/L2 message) to the cell instead of RRC reestablishment. The UE (200) may decide whether to send LTM completion message or send the RRC reestablishment based on a flag received from the network (gNB).

In an embodiment, during the RRC reestablishment procedure (as in TS 38.331), the UE (200) stores the candidate LTM configurations (e.g., candLTM-RRCReconfig or candLTM-CellGroupConfig). The UE (200) may store the configurations based on the flag (e.g., storeCandidateLTM) received from the network entity (100). Further, the UE (200) may restore the candidate LTM configurations once the RRC reestablishment is successful. In an embodiment, the UE (200) decides whether to restore or release the candidate LTM configurations based on a flag (e.g., restoreCandidateLTM).

As shown in FIG. 3, at step 1, the RRC layer (102) of the gNB sends the RRC reconfiguration including candLTM-RRCReconfig or candLTM-CellGroupConfig, LTMMeasurementConfig etc., to the RRC layer of the UE (200). At step 2, the RRC of the UE (200) sends the RRC reconfiguration complete to the RRC layer (102) of the gNB. At step 3, the L1/L2 of the UE (200) determines the radio link failure. At 4, the L1/L2 of the UE (200) performs the cell selection while T311 is running. At 5, the L1/L2 of the UE (200) releases the LTM configuration, LTM measurement configuration, reference configuration and all other configurations related to the LTM. At 6, the RRC of the UE (200) sends the RRC reestablishment to the gNB-RRC (102).

Figure 4:
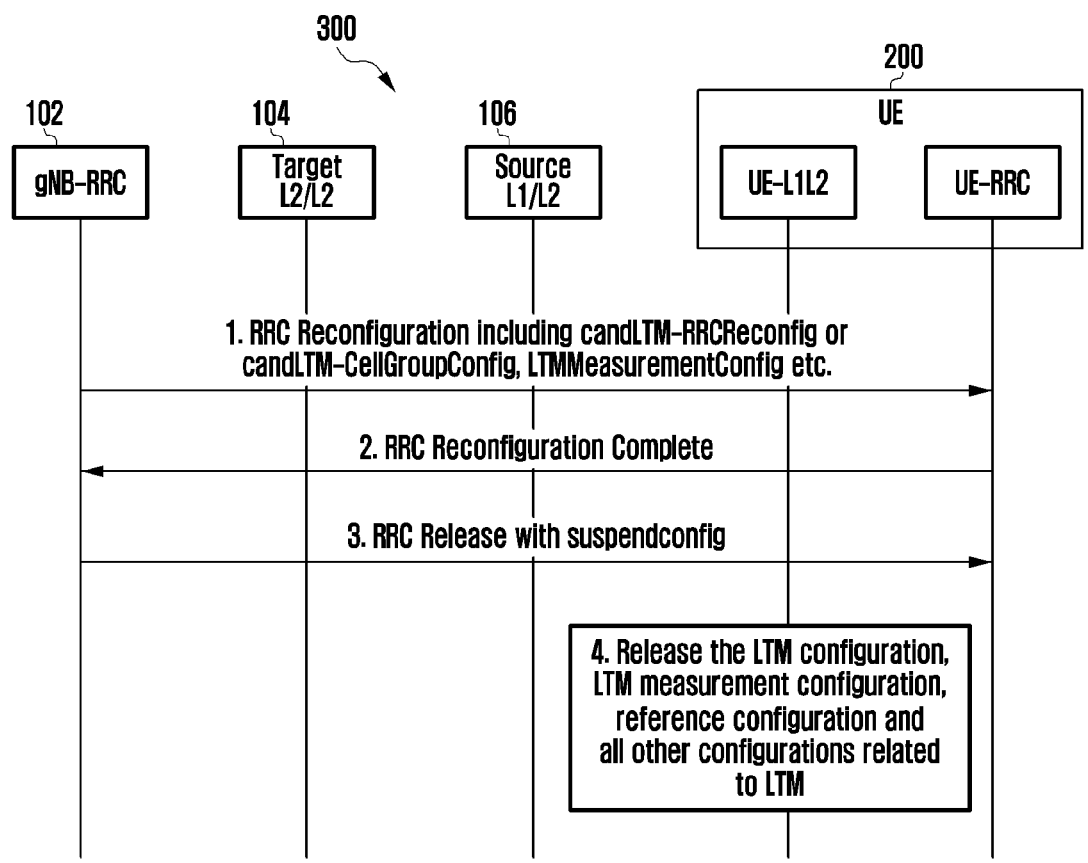
FIG. 4 illustrates a sequence diagram of a process of handling of LTM configuration during suspend and resume according to embodiments as disclosed herein.

FIG. 4 illustrates a sequence diagram of a process of handling of LTM configuration during suspend and resume according to embodiments as disclosed herein. In an embodiment, on receiving RRC Release (such as NR RRCRelease message) or RRC Release with suspend config, the UE (200) releases any configuration ((configured via the candLTM-Reconfiguration or the candLTM-CellGroupConfig) for the LTM. In an embodiment, the UE (200) stores the configuration during RRC Release with suspend config and further releases the configurations for LTM during RRC Resume procedure. The RRC resume procedure includes the various steps as detailed in 3GPP TS 38.331.

As shown in FIG. 4, at step 1, the RRC layer (102) of the gNB sends the RRC reconfiguration including candLTM-RRCReconfig or candLTM-CellGroupConfig, LTMMeasurementConfig etc., to the RRC layer of the UE (200). At step 2, the RRC of the UE (200) sends the RRC reconfiguration complete to the RRC layer (102) of the gNB. At step 3, the RRC layer (102) of the gNB RRC Release with suspendconfig to the RRC layer of the UE (200). At step 4, the L1/L2 of the UE (200) releases the LTM configuration, the LTM measurement configuration, the reference configuration and all other configurations related to the LTM.

Figure 5:
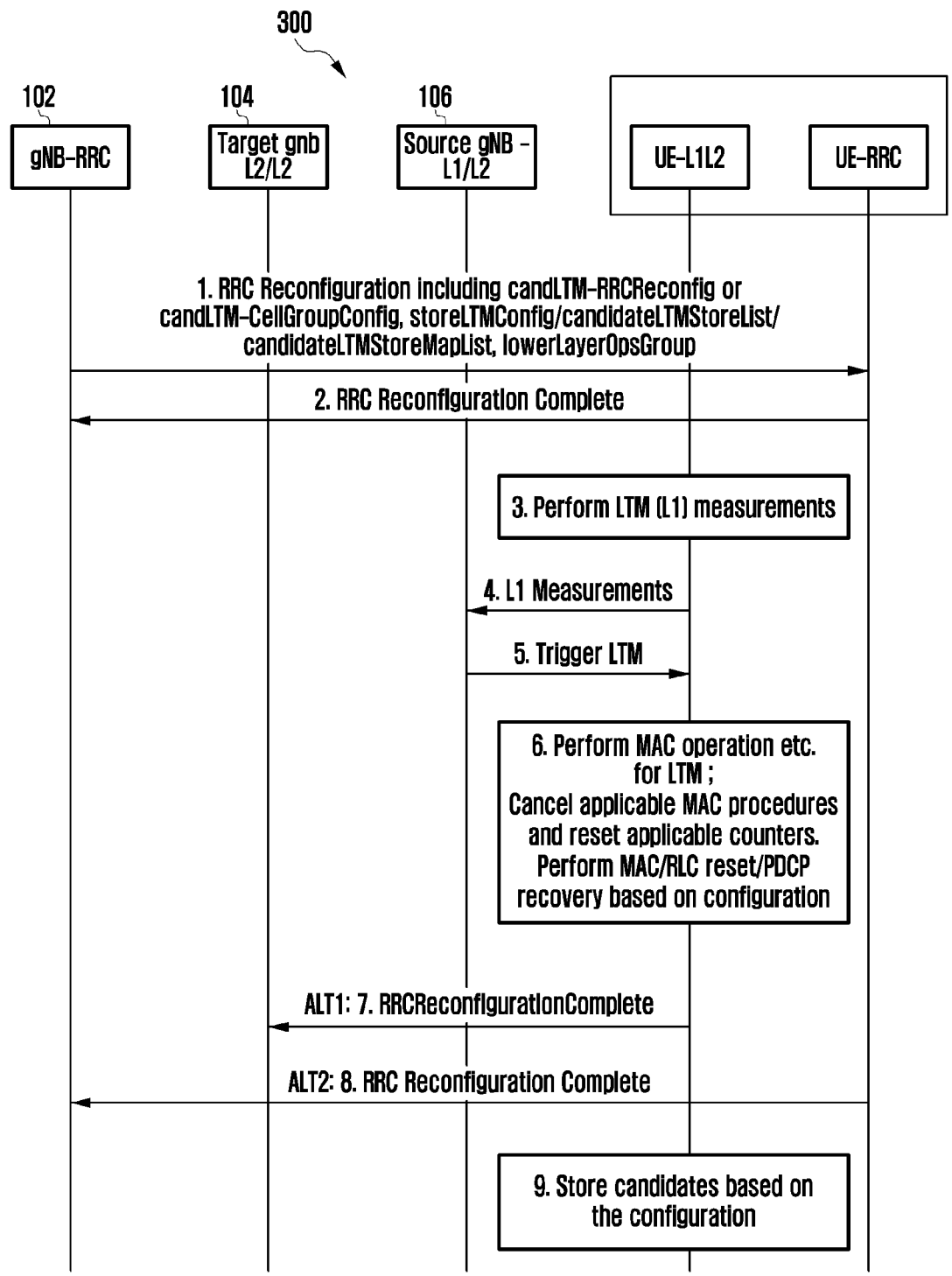
FIG. 5 illustrates a sequence diagram illustrating an overall LTM flow according to embodiments as disclosed herein.

FIG. 5 illustrates a sequence diagram of an overall LTM flow according to embodiments as disclosed herein. As shown in FIG. 5, at step 1, the RRC layer (102) of the gNB sends the RRC reconfiguration including candLTM-RRCReconfig or candLTM-CellGroupConfig, storeLTMConfig/candidateLTMStoreList/candidateLTMStoreMapList, lowerLayerOpsGroup to the RRC layer of the UE (200). At step 2, the RRC of the UE (200) sends the RRC reconfiguration Complete to the RRC layer (102) of the gNB. At step 3, the L1/L2 of the UE (200) performs the LTM (L1) measurements. At step 4, the L1/L2 of the UE (200) sends the L1 measurements to the L1/L2 (106) of the Source gNB. At step 5, the L1/L2 (106) of the source gNB sends a trigger LTM message to the L1/L2 of the UE (200).

At step 6, L1/L2 of the UE (200) performs the MAC operation etc. for LTM. Further, the L1/L2 of the UE (200) cancels the applicable MAC procedures and resets applicable counters. Further, the L1/L2 of the UE (200) performs the MAC/RLC reset/PDCP recovery based on configuration. In an embodiment, at step 7, the L1/L2 of the UE (200) sends the RRCReconfigurationComplete to the target gNB L2/L2 104. In an embodiment, at 8, the RRC of the UE (200) sends the RRC reestablishment to the gNB-RRC (102). At step 9, the L1/L2 of the UE (200) stores the candidates based on the configuration.

Storing LTM configuration: In an embodiment, for each candidate cell in LTM, the UE (200) receives a configuration from the gNB whether other candidate cell configurations can be kept for subsequent mobility. In an embodiment, this may be a flag (e.g., storeLTMconfig or the like) which indicates to keep all the candidate cells. In another embodiment, this may be a list of candidate cells (for e.g., cell identifiers or list of indices of candidate cells, candidateLTMStoreList or the like) whose configuration could be kept. storeLTMconfig or candidateLTMStoreList can be provided to the UE (200) in RRC reconfiguration message by the gNB.

In an embodiment, the information may be provided in the RRC reconfiguration message by the source cell. An example structure is shown below in TABLE 3.

TABLE 3

```
RRCReconfiguration-v18xx-Ies ::= SEQUENCE {
    candLTM-Reconfiguration-r18    SEQUENCE    CandLTM-Reconfiguration
    OPTIONAL,
    candLTM-CellGroupConfig-r18 CandLTM-CellGroupConfig    OPTIONAL,
    storeLTMconfig BOOLEAN OPTIONAL, //Alternatively, can be enumerated.
    candidateLTMStoreList       CandidateLTMStoreList OPTIONAL,
    lateNonCriticalExtension OCTET STRING       OPTIONAL,
    nonCriticalExtension RRCReconfiguration-v1xxx-Ies OPTIONAL
}
CandidateLTMStoreList SEQUENCE (SIZE (1.. maxNr)) OF CandLTM-Index
CandLTM-Index INTEGER (1..maxNr)
```

In an embodiment, the gNB provides the flag storeLTMconfig, for the source cell and for each candidate cell. If the UE (200) has received storeLTMconfig for the source cell or for a candidate cell, the UE (200) stores the LTM configuration for all the candidate cells. An example structure is shown below in TABLE 4.

TABLE 4

CandLTM-ToAddMod ::= SEQUENCE {
  candLTM-ReconfigId CandLTM-ReconfigId,
  candLTM-RRCReconfig OCTET STRING (CONTAINING RRCReconfiguration) OPTIONAL,
  storeLTMconfig BOOLEAN OPTIONAL, //Alternatively, can be enumerated.
}
CandLTM-ToAddMod ::= SEQUENCE {
  candLTM- CellGroupConfigId CandLTM- CellGroupConfig Id,
  candLTM- CellGroupConfig  OCTET  STRING  (CONTAINING CellGroupConfig) OPTIONAL,
  storeLTMconfig BOOLEAN OPTIONAL, //Alternatively, can be enumerated
}

In an embodiment, the gNB provides the candidateLTMStoreList for the source cell and for each candidate cell. If the UE (200) has received candidateLTMStoreList for the candidate cell, the UE (200) stores the LTM configuration for all the candidate cells in candidateLTMStorList while the stored candidate cell has become source cell. In other words, during the LTM to the candidate cell, the UE (200) stores all the candidate cells in candidateLTMStoreList).

An example structure is shown below in TABLE 5.

TABLE 5

CandLTM-ToAddMod ::= SEQUENCE {
  candLTM-ReconfigId CandLTM-ReconfigId,
  candLTM-RRCReconfig OCTET STRING (CONTAINING RRCReconfiguration) OPTIONAL,
  candidateLTMStoreList   CandidateLTMStoreList OPTIONAL,
}
CandLTM-ToAddMod ::= SEQUENCE {
  candLTM- CellGroupConfigId CandLTM- CellGroupConfig Id,
  candLTM- CellGroupConfig  OCTET  STRING  (CONTAINING CellGroupConfig) OPTIONAL,
  candidateLTMStoreList         CandidateLTMStoreList OPTIONAL,
}
CandidateLTMStoreList SEQUENCE (SIZE (1.. maxNr)) OF CandLTM-Index
CandLTM-Index INTEGER (1..maxNr)

In an embodiment, the source cell provides a mapping outside candLTM-ToAddMod. The gNB provides the list of candidate cells (candX) and the mapped list of cell ids or the indices of the candidate cells (candidateLTMStoreList) whose configuration could be stored for each candX. Once the UE (200) moves to a cell in candX due to the LTM, the UE (200) stores (or updates the storage) the LTM configuration for all the cells in candidateLTMStoreList, if available, as shown in TABLE 6.

TABLE 6

RRCReconfiguration-v18xx-Ies ::= SEQUENCE {
candLTM-Reconfiguration-r18   SEQUENCE   CandLTM-Reconfiguration OPTIONAL,
candLTM-CellGroupConfig-r18 CandLTM-CellGroupConfig OPTIONAL,
storeLTMconfig BOOLEAN OPTIONAL, //Alternatively, can be enumerated.
candidateLTMStoreMapList    CandidateLTMStoreMapList OPTIONAL,
lateNonCriticalExtension OCTET STRING OPTIONAL,
nonCriticalExtension RRCReconfiguration-v1xxx-Ies OPTIONAL
}

TABLE 6-continued

```
CandidateLTMStoreMAPList    SEQUENCE    (SIZE    (1..    max Nr))    OF
CandidateLTMStoreMAP
CandidateLTMStoreMAP ::= SEQUENCE {
  sourceCellId PCI;
  candidateLTMStoreList    CandidateLTMStoreList OPTIONAL,
}
```

The UE (200) stores the LTM configuration of all candidates in candidateLTMStoreList, if available, when the candidate identified by the sourceCellId becomes the source cell.

If the sourcecellId is not present in CandidateLTMStoreMAP or if there is no mapped candidateLTMStoreList in the candidateLTMStoreMap, the UE (200) may not store the LTM configuration of any candidates, when the candidate identified by the sourceCellId becomes the source cell.

Handling of Lower Layer resets: In an embodiment, the gNB includes in the cellgroupconfig IE within the candidate cell's RRC message used for configuring the L1/L2 mobility, whether the UE (200) need to perform MAC reset or not during LTM to the candidate cell. The gNB may instruct the UE (200) to perform partial reset through the IE within cellgroupconfig IE within the candidate cell's RRC message used for configuring the L1/L2 mobility (for e.g., within candLTM-RRCReconfig or candLTM-CellGroupConfig).

In an embodiment, the gNB indicates whether the UE (200) needs to perform the MAC reset during the LTM to the candidate cell in the DL MAC CE or the DL L1 message used for triggering the LTM. In an embodiment, if the gNB has indicated whether the UE (200) needs to perform the MAC reset in MAC CE or the DL L1 message and also in the RRC message as above, the UE (200) follows the indication in the MAC CE or the DL L1 message and ignores the indication from the RRC message.

In an embodiment, the gNB includes the flag to indicate whether the UE (200) needs to trigger RLC re-establishment during execution of the LTM. In an embodiment, the information is included within the candidate cell's RRC message used for configuring the L1L2 mobility. In an embodiment, the gNB includes this flag for each RLC bearer configured for the candidate cell.

In an embodiment, the gNB indicates whether the UE (200) needs to perform the RLC reestablishment during the LTM to the candidate cell in the DL MAC CE or the DL L1 message used for triggering LTM. In an embodiment, if the gNB has indicated whether the UE (200) needs to perform the RLC reestablishment in the MAC CE or the DL L1 message and also in the RRC message as above, the UE (200) follows the indication in the MAC CE or the DL L1 message and ignores the indication from the RRC message.

If the gNB has indicated that the UE (200) needs to perform RLC reestablishment in the DL MAC CE or the DL L1 message, the UE (200) performs RLC reestablishment during LTM on all the RLC bearers.

In an embodiment, the gNB includes the flag to indicate whether the UE (200) needs to perform a PDCP recovery/SDAP reset during execution of the LTM. In an embodiment, the information is included within the candidate cell's RRC message used for configuring the LTM. In an embodiment, the gNB includes the flag for each radio bearer configured for the candidate cell. In an embodiment, separate flags may be used for the PDCP recovery and SDAP reset.

In an embodiment, the gNB indicates whether the UE (200) needs to perform the PDCP recovery/SDAP reset during the LTM to the candidate cell in the DL MAC CE or the DL L1 message used for triggering LTM. In an embodiment, if the gNB has indicated whether the UE (200) needs to perform PDCP recovery/SDAP reset in the MAC CE or the DL L1 message and also in the RRC message as above, the UE (200) follows the indication in the MAC CE or the DL L1 message and ignores the indication from the RRC message. If the gNB has indicated that the UE (200) needs to perform the PDCP recovery/SDAP reset in the DL MAC CE or the DL L1 message, the UE (200) performs the PDCP recovery/SDAP reset during LTM on all the radio bearers.

In an embodiment, for each candidate cell, the gNB may provide a mapping of other candidate cells (cell ids or indices etc.) which indicates whether the UE (200) needs to perform at least one of MAC reset, RLC reestablishment and PDCP recovery/SDAP reset.

In an embodiment, for each candidate cell, the gNB may provide a list of candidate cells (cell ids or indices etc.) which indicates and if the UE (200) moves within these cells, it excludes performing at least one of the MAC reset, the RLC reestablishment and the PDCP recovery. If the UE (200) moves from any of the cells in the list to a cell outside the list, the UE (200) performs at least one of the MAC reset, the RLC reestablishment, the PDCP recovery and the SDAP reset. If the UE (200) moves to any of these cells from a cell outside the list, the UE (200) performs at least one of the MAC reset, the RLC reestablishment and the PDCP recovery and the SDAP reset.

TABLE 7

```
RRCReconfiguration-v18xx-Ies ::= SEQUENCE {
  candLTM-Reconfiguration-r18    SEQUENCE    CandLTM-Reconfiguration
OPTIONAL,
  candLTM-CellGroupConfig-r18 CandLTM-CellGroupConfig OPTIONAL,
  storeLTMconfig BOOLEAN OPTIONAL, //Alternatively, can be enumerated.
  candidateLTMStoreMapList    CandidateLTMStoreMapList OPTIONAL,
  lowerLayerOpsGroup LowerLayerOpsGroup OPTIONAL,
    lateNonCriticalExtension OCTET STRING
OPTIONAL,
    nonCriticalExtension RRCReconfiguration-v1xxx-Ies OPTIONAL
}
```

In an embodiment, a single flag in the MAC CE or the L1 indication (DCI) is used for indication and can be used for performing the MAC reset or the RLC reestablishment or the PDCP recovery or the SDAP reset.

MAC Cancellation and counter resets during cell switch in LTM: During LTM, the UE (200) cancels one or more of the following UL MAC procedures such as triggered scheduling request procedure, triggered buffer status reporting procedure, triggered power headroom reporting procedure, triggered consistent LBT, triggered BFR, triggered Sidelink buffer status reporting procedure, triggered Pre-emptive buffer status reporting procedure, triggered timing advance reporting procedure, triggered recommended bit rate query procedure, triggered Configured uplink grant confirmation, triggered configured sidelink grant confirmation, triggered desired guard symbol query, triggered positioning measurement gap activation/deactivation request procedure and triggered SDT procedure. In an embodiment, this may be performed during LTM completion. In an embodiment, this may be performed after receiving DL LTM trigger for cell switch.

In an embodiment, the UE (200) resets all the counters of beam failure indication (BFI_COUNTER) or listen before transmission (LBT_COUNTER) during LTM. In an embodiment, this may be performed during LTM completion. In an embodiment, this may be performed after receiving DL LTM trigger for cell switch.

In an embodiment, the UE (200) performs the above cancellations and counter resets only when the MAC is reset during cell switch during LTM. In an embodiment, the UE (200) performs above cancellations and counter resets when the MAC is not reset or is not completely reset, or MAC is partially reset during cell switch during the LTM.

In an embodiment, if the UE (200) initiated transmission of a UEAssistanceInformation (UAI) message for the corresponding cell group (MCG/SCG) during a fixed time (for e.g., the last 1 second) before receiving LTM trigger, the UE (200) retransmits the UEAssistanceInformation after LTM completion. The UAI may be send by the UE (200) to provide assistance information to the network, for e.g., for power saving or multi-sim operation or avoiding in-device interference. In an embodiment, the UE (200) retransmits the UAI only if the UE (200) is still configured to provide the concerned UEassistance information for the corresponding cell group.

In an embodiment, if the SIB12 is provided by a target PCell, and the UE (200) initiated transmission of a SidelinkUEInformationNR message indicating a change of NR sidelink communication/discovery related parameters relevant in the target PCell (i.e., change of sl-RxInterestedFreqList or sl-TxResourceReqList) during a fixed time (for e.g., the last 1 second) before LTM trigger, UE (200) initiates transmission of the SidelinkUEInformationNR message after LTM completion. The SidelinkUEInformationNR may be used to provide information about interested frequencies, sidelink transmission resources etc. to the network by the UE (200).

In an embodiment, if the UE (200) initiated transmission of an MBSInterestIndication message during the last 1 second preceding LTM trigger, the UE (200) initiates initiate transmission of an MBSInterestIndication message, for e.g., in accordance with clause 5.9.4 of TS 38.331 after LTM completion. The MBSInterestIndication message is used to provide information about the interests for MBS such as interested frequencies.

In an embodiment retransmission of UAI/SidelinkUEInformationNR/MBSInterestIndication is performed only if the UE (200) performs RACH during LTM execution on the target cell after LTM completion.

In an embodiment the UE (200) cancels the procedure for triggering BSR for XR (with new BSR tables).

A sample specification update according to TS 38.321 is given below. On receiving a trigger of LTM (DL MAC CE or L1 message for triggering LTM), UE (200) performs the following:

1> cancel, if any, triggered Scheduling Request procedure;
1> cancel, if any, triggered Buffer Status Reporting procedure;
1> cancel, if any, triggered Power Headroom Reporting procedure;
1> cancel, if any, triggered consistent LBT failure;
1> cancel, if any, triggered BFR;
1> cancel, if any, triggered Sidelink Buffer Status Reporting procedure;
1> cancel, if any, triggered Pre-emptive Buffer Status Reporting procedure;
1> cancel, if any, triggered Timing Advance Reporting procedure;
1> cancel, if any, triggered Recommended bit rate query procedure;
1> cancel, if any, triggered Configured uplink grant confirmation;
1> cancel, if any, triggered configured sidelink grant confirmation;
1> cancel, if any, triggered Desired Guard Symbol query;
1> cancel, if any, triggered Positioning Measurement Gap Activation/Deactivation Request procedure;
1> cancel, if any, triggered SDT procedure;
2> reset all BFI_COUNTERs; and
1> reset all LBT_COUNTERs.

Figure 6:
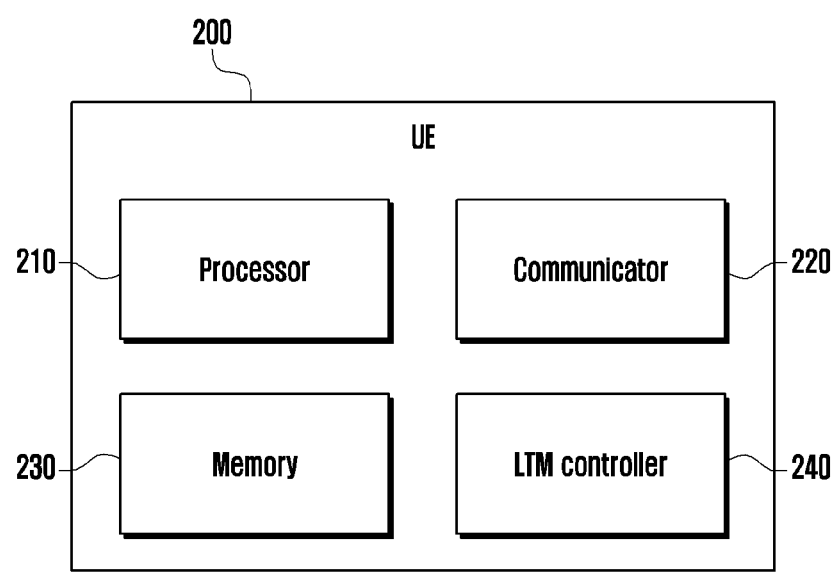
FIG. 6 illustrates various hardware components of a UE according to the embodiments as disclosed herein.

FIG. 6 illustrates various hardware components of the UE (200) according to the embodiments as disclosed herein. In an embodiment, the UE (200) includes a processor (210), a communicator (220), a memory (230) and a LTM controller (240). The processor (210) is coupled with the communicator (220), the memory (230) and the LTM controller (240).

In an embodiment, the LTM controller (240) receives the LTM configuration in the RRC message indicating whether the UE (200) needs to perform one of: the RLC reestablishment and the PDCP recovery during the LTM to the candidate cell. Further, the LTM controller (240) receives the DL MAC CE or the DL L1 message used for triggering the LTM. Further, the LTM controller (240) performs the MAC operation including the complete MAC reset and the partial MAC reset. In an example, the MAC operation can be, for example, but not limited to the cancelation of the UL MAC procedure. The UL MAC procedure includes the triggered scheduling request procedure, the triggered buffer status reporting procedure, the triggered power headroom reporting procedure, the triggered consistent LBT failure, the triggered BFR, the triggered side-link buffer status reporting procedure, the triggered pre-emptive buffer status reporting procedure, the triggered timing advance reporting procedure, the triggered recommended bit rate query procedure, the triggered configured uplink grant confirmation, the triggered configured side-link grant confirmation, the triggered desired guard symbol query, the triggered positioning measurement gap activation request procedure, the triggered positioning measurement gap deactivation request procedure, the triggered Small SDT procedure, and the reset of all counters of a beam failure indication or the consistent listen before transmission failure. Further, the LTM controller (240) transmits (retransmits) the uplink RRC message, where the uplink RRC message was transmitted (retransmitted) within the specificized time interval before receiving the DL MAC CE or the DL L1 message. The RRC message transmitted by the UE (200) is one of the UAI, the SidelinkUEInformationNR and the MBSInterestIndication. The UAI is retransmitted by the UE (200) upon determining that the UE (200) is still configured to provide a concerned UE assistance information for a corresponding cell group after the LTM completion. In an example, the specificized time interval is one second. Based on the received indication, the LTM controller (240) performs one of: the RLC reestablishment and the PDCP recovery.

In another embodiment, the LTM controller (240) receives the trigger of the LTM from the network entity (100). Based on the trigger, the LTM controller (240) performs the one or more operation(s). The one or more operation (s) includes the UL MAC procedure, the resets all counters of the beam failure indication, the listen before transmission during the LTM, and cancel the procedure for triggering the BSR for the XR.

In another embodiment, the LTM controller (240) receives the RRCReconfiguration message including the list of LTM candidate configurations to be added or modified, the list of LTM candidate configuration to be released, the measurement configuration for the LTM, and the reference configuration information from the network entity (100). Based on the RRCReconfiguration message, the LTM controller (240) receives the MAC CE from the network entity (100) to switch the UE (200) from the source cell to the candidate cell. In an embodiment, the LTM controller (240) receives the candidateLTM configuration to release the candidateLTM configuration. In an embodiment, the LTM controller (240) receives the candLTM-CellGroupConfigToRemoveList including the list of candLTM-CellGroupConfigId from the network entity (100) to remove all candidateLTM configurations identified by the candLTM-CellGroupConfigId in the candLTM-CellGroupConfigToRemoveList. In an embodiment, the LTM controller (240) receives the candLTM-ReconfigToRemoveList including the list of candLTM-ReconfigId from the network entity (100) to remove all candidateLTM configurations identified by the candLTM-ReconfigId in the candLTM-ReconfigToRemoveList. In another embodiment, the LTM controller (240) receives the L1 measurement configuration in the RRC reconfiguration message from the network entity (100) for performing the L1 measurements for the LTM. In another embodiment, the LTM controller (240) receives the RRC message which indicate to send RRCReconfigurationComplete upon completion of LTM. In another embodiment, the LTM controller (240) configures the UE (200) to send the RRC message to indicate the completion of the handover, when the UE (200) sends the RRC reconfiguration complete message to the network entity (100).

In another embodiment, the LTM controller (240) configures the flag that indicates whether the UE (200) performs the LTM to complete the LTM or the UE sends a RRCReestablishment during failure. Further, the LTM controller (240) configures the first timer for performing the access on a first target candidate cell. Further, the LTM controller (240) determines the expiry of the first timer, while trying to access the first target candidate cell for completing the LTM. The first timer is included in the candidate cell LTM configuration, where the candidate cell LTM configuration includes of the candLTM-RRCReconfig. Based on the determination, the LTM controller (240) detects that the RLF has occurred in the UE (200). Further, the LTM controller (240) attempts to select the suitable cell for the duration of the second timer and selects a cell within a second timer value upon determining that the selected cell is a second target candidate cell. Based on the flag, the LTM controller (240) initiates the RRC reestablishment procedure to access the second target candidate cell and indicates in RRCRestablishment message that the LTM has failed. In another embodiment, Based on the flag, the LTM controller (240) completes the LTM by sending a L3 message for completing the handover.

In another embodiment, the LTM controller (240) performs the cell selection while the timer is running during the RRC reestablishment procedure. Further, the LTM controller (240) removes the configuration for the LTM. The configuration includes the candidate cell configuration or measurement configuration for the LTM during the RRC reestablishment procedure. In an embodiment, the LTM controller (240) determines that the UE (200) selects the cell for which the candLTM-RRCReconfig is available during the reestablishment procedure. Further, the LTM controller (240) sends the LTM completion message to the cell. In another embodiment, the LTM controller (240) determines while sending the LTM completion message or the RRC reestablishment based on the flag received from the network entity (100).

In another embodiment, the LTM controller (240) performs one of: receiving a RRC Release message and transitioning to RRC_IDLE, or receives the RRC Release with suspend config and transitions to RRC_INACTIVE, or initiates the RRCReestablishment and completes the cell selection while timer T311 is running. Further, the LTM controller (240) releases the configuration for LTM upon receiving one of: the RRC Release and the RRC Release with suspend config, upon initiating a RRCReestablishment or following cell selection while timer T311 is running. The configuration is configured via the candLTM-Reconfiguration.

The LTM controller (240) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (210) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (210) may include multiple cores and is configured to execute the instructions stored in the memory (230).

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 6 shows various hardware components of the UE (200) but it is to be understood that other embodiments are not limited thereon. In other embodiments, the UE (200) may include less or more number of components. Further, the labels or names of the components are used only for illustrative purpose and does not limit the scope of the present disclosure. One or more components can be combined together to perform same or substantially similar function in the UE (200).

Figure 7:
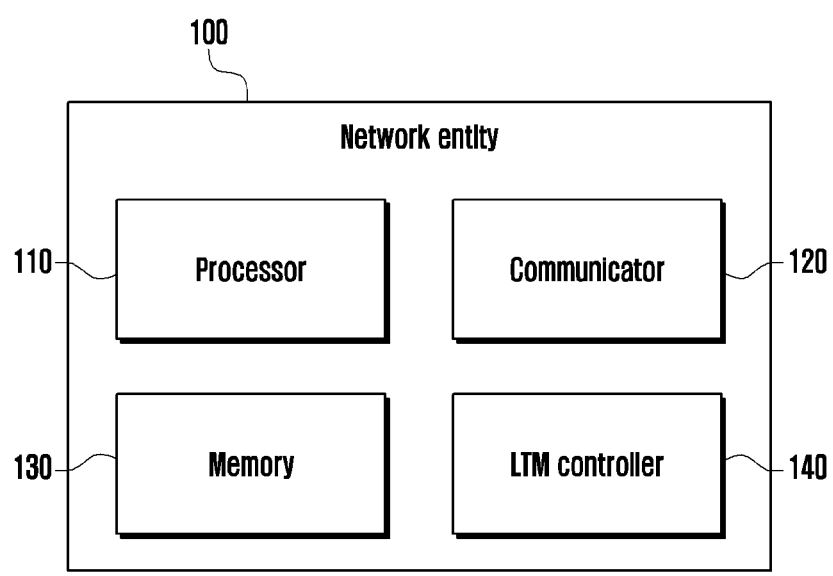
FIG. 7 illustrates various hardware components of a network entity (e.g., eNB, gNB or the like) according to the embodiments as disclosed herein.

FIG. 7 illustrates various hardware components of the network entity (100) according to the embodiments as disclosed herein. The network entity (100) can be, for example, but not limited to the gNB, the eNB, a new radio (NR) trans-receiver or the like. In an embodiment, the network entity (100) includes a processor (110), a communicator (120), a memory (130) and a LTM controller (140). The processor (110) is coupled with the communicator (120), the memory (130) and the LTM controller (140).

In an embodiment, the LTM controller (140) generates the LTM configuration. Further, the LTM controller (140) indicates one of: whether the UE (200) needs to perform the RLC reestablishment and the PDCP recovery during the LTM to the candidate cell, and whether the UE (200) needs to trigger the RLC re-establishment during execution of LTM based on a flag indication. Based on the flag indication, the LTM controller (140) triggers the LTM.

In another embodiment, the LTM controller (140) sends the RRC reconfiguration message including the list of LTM candidate configurations to be added or modified, the list of LTM candidate configuration to be released, the measurement configuration for the LTM, and the reference configuration information. Based on the RRC reconfiguration message, the LTM controller (140) receives the layer 1 measurements. In an embodiment, The LTM candidate configurations to be added or modified included in the RRC reconfiguration message send by the network entity (100) includes at least one of: an identifier and an OCTET STRING containing the RRC reconfiguration message, where the UE (200) adds the candidate cell. In an embodiment, the LTM candidate configurations to be released included in the RRC reconfiguration message includes an identifier corresponding to the identifier included in the list of LTM candidate configuration, where the UE (200) releases the LTM candidate configuration identified by the identifier. The reference configuration information is an OCTETSTRING containing the RRC reconfigurastion message. Upon receiving the layer 1 measurements, the LTM controller (140) sends the MAC CE to switch the UE (200) from the source cell to the candidate cell.

In an embodiment, the LTM candidate configuration comprises one of: a configuration to modify a radio bearer on performing one of a L1 mobility and a L2 mobility from the network entity (100), and the measurement configuration to the UE (200) to modify the measurement configuration on performing the L1/L2 mobility from the network entity (100).

The LTM controller (140) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (110) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (140) may include multiple cores and is configured to execute the instructions stored in the memory (130).

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 7 shows various hardware components of the network entity (100), but it is to be understood that other embodiments are not limited thereon. In other embodiments, the network entity (100) may include less or more number of components. Further, the labels or names of the components are used only for illustrative purpose and does not limit the scope of the present disclosure. One or more components can be combined together to perform same or substantially similar function in the network entity (100).

Figure 8:
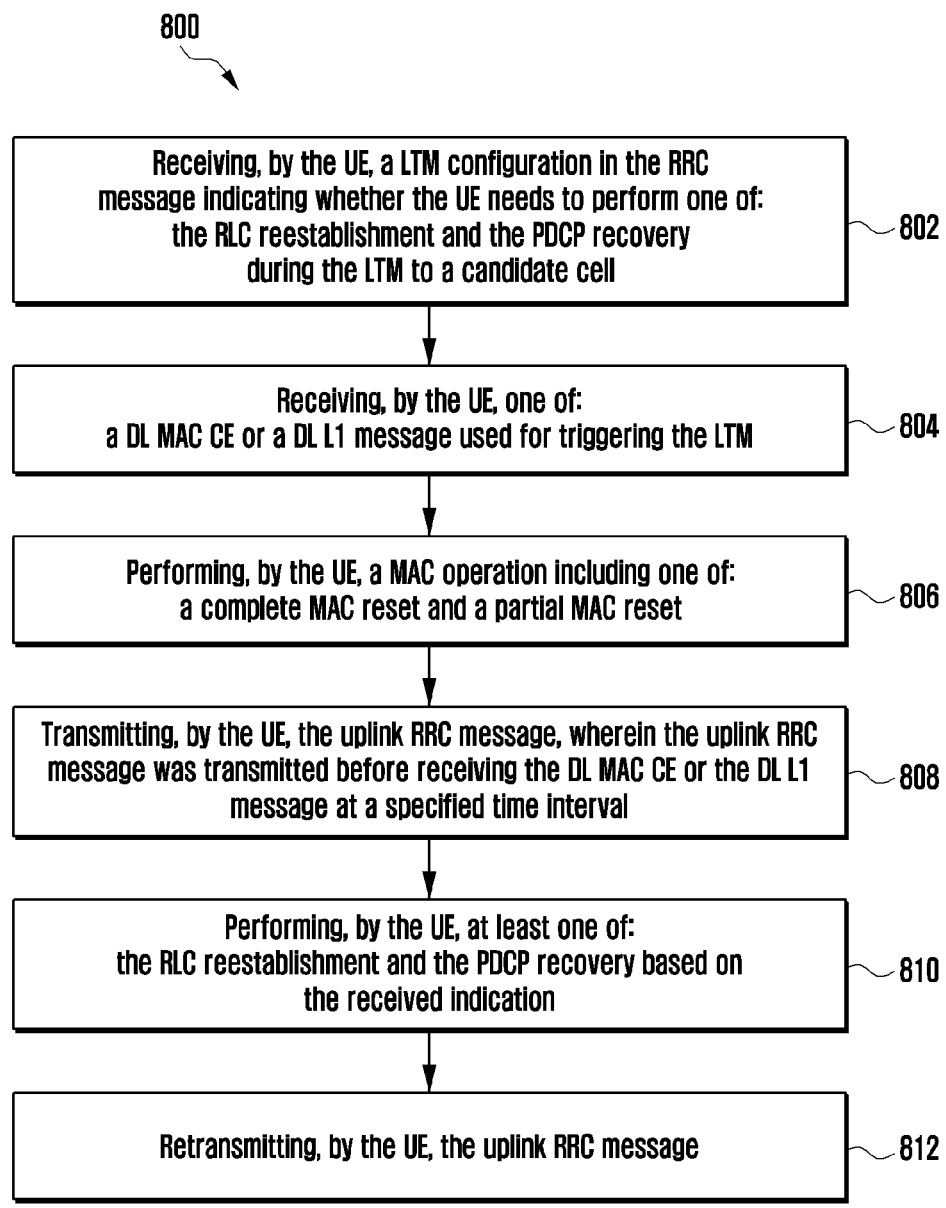
FIG. 8 illustrates a flowchart of a method of UE for performing the LTM in a wireless network while performing a RLC reestablishment and a PDCP recovery based on an indication according to the embodiments as disclosed herein.

FIG. 8 illustrates a flowchart (800) illustrating a method of UE for performing the LTM in the wireless network (300) while performing the RLC reestablishment and the PDCP recovery based on the indication according to the embodiments as disclosed herein. The operations (802-810) are handled by the LTM controller (240).

At step 802, the method includes receiving the LTM configuration in the RRC message indicating whether the UE (200) needs to perform one of: the RLC reestablishment and the PDCP recovery during the LTM to the candidate cell. At step 804, the method includes receiving one of: the DL MAC CE or the DL L1 message used for triggering the LTM. At step 806, the method includes performing the MAC operation including one of: the complete MAC reset and the partial MAC reset. At step 808, the method includes transmitting the least one uplink RRC message. The at least one uplink RRC message was transmitted within the specificized time interval before receiving the DL MAC CE or the DL L1 message. At step 810, the method includes performing at least one of: the RLC reestablishment and the PDCP recovery based on the received indication. At step 812, the method includes retransmitting the uplink RRC message.

Figure 9:
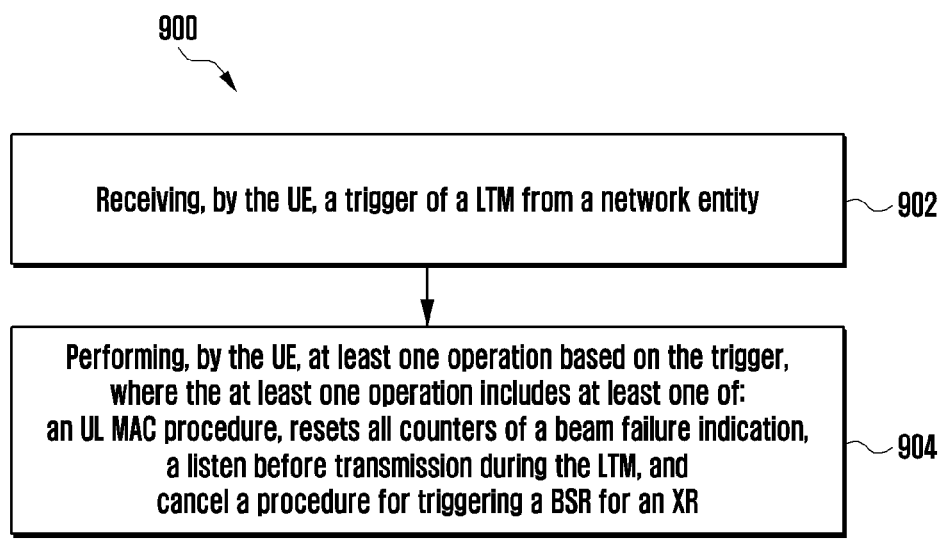
FIG. 9 illustrates another flowchart of a method of UE for performing the LTM in the wireless network according to the embodiments as disclosed herein.

FIG. 9 illustrates another flowchart (900) of a method of UE for performing the LTM in the wireless network (300), according to the embodiments as disclosed herein. The operations (step 902 and step 904) are handled by the LTM controller (240). At step 902, the method includes receiving the trigger of the LTM from the network entity (100). At step 904, the method includes performing the operation based on the trigger, where the operation includes at least one of: the UL MAC procedure, the resets all counters of the beam failure indication, the listen before transmission during the LTM, and cancel the procedure for triggering the BSR for the XR.

Figure 10:
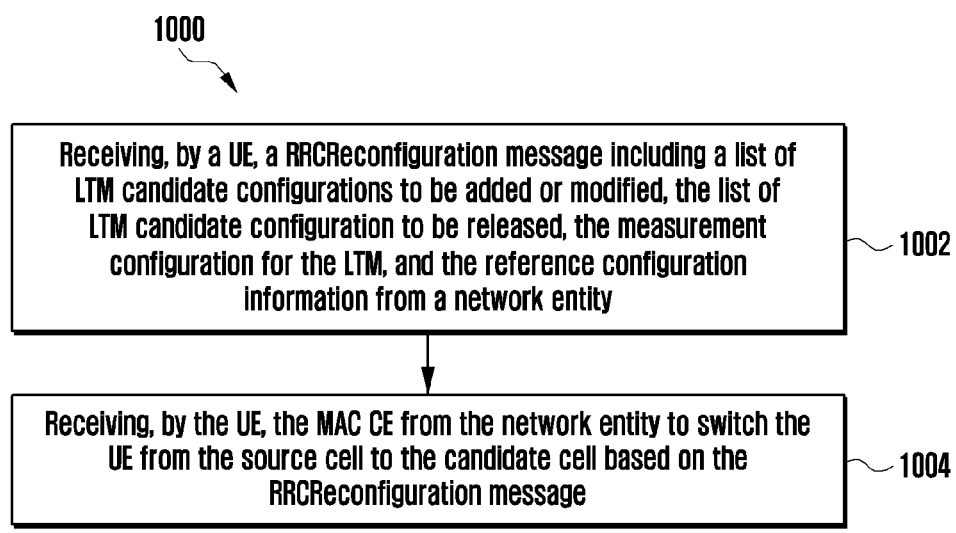
FIG. 10 illustrates another flowchart of a method of UE for performing the LTM in the wireless network based on a RRCReconfiguration message according to the embodiments as disclosed herein.

FIG. 10 illustrates another flowchart (1000) of a method of UE, implemented by the UE (200), for performing the LTM in the wireless network (300) based on the RRCReconfiguration message, according to the embodiments as disclosed herein. The operations (1002-1004) are handled by the LTM controller (240).

At step 1002, the method includes receiving the RRCReconfiguration message including the list of LTM candidate configurations to be added or modified, the list of LTM candidate configuration to be released, the measurement configuration for the LTM, and the reference configuration information from the network entity (100). At step 1004, the method includes receiving the MAC CE from the network entity (100) to switch the UE (200) from the source cell to the candidate cell based on the RRCReconfiguration message.

Figure 11:
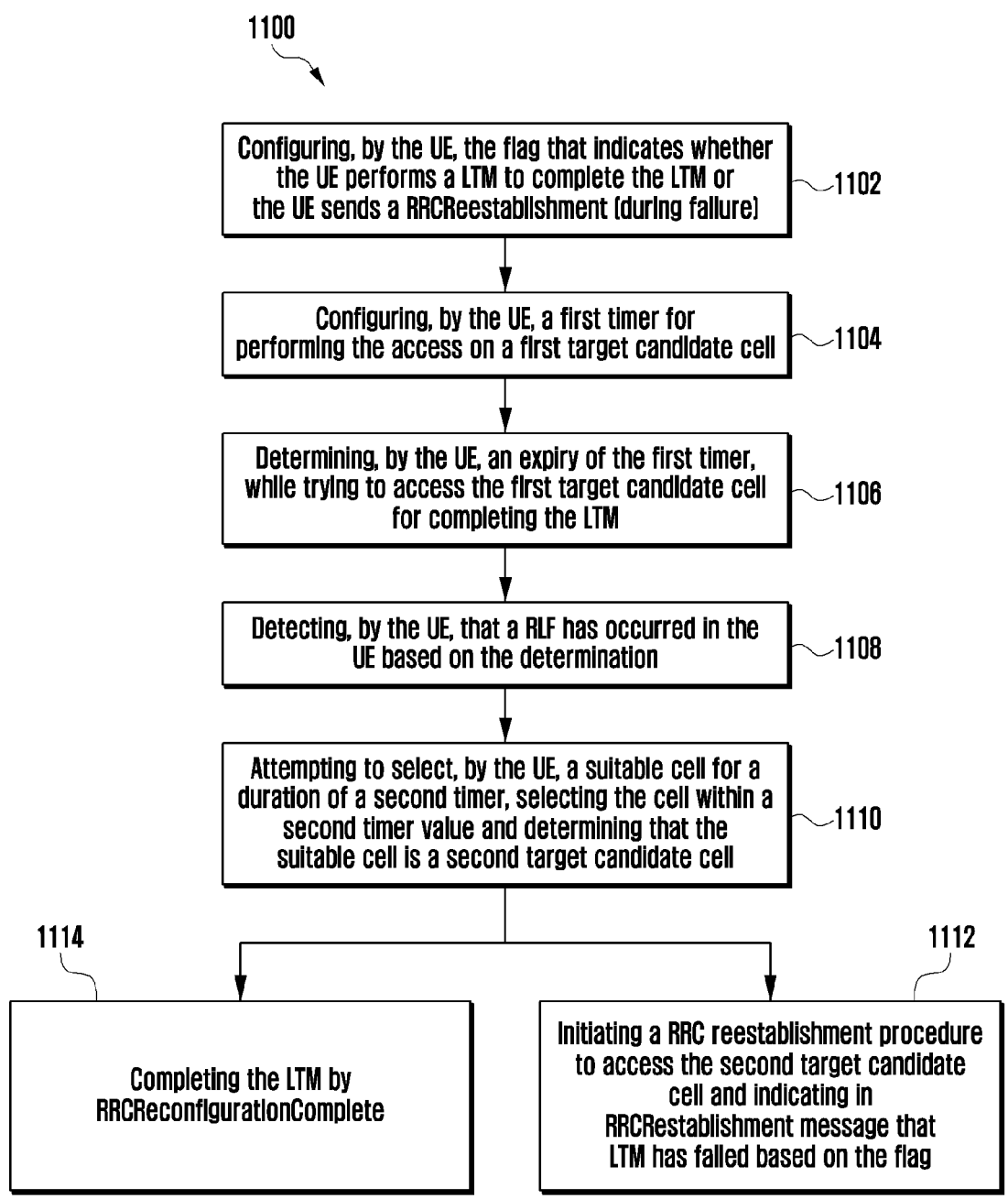
FIG. 11 illustrates another flowchart of a method of UE for performing the LTM in the wireless network based on a flag according to the embodiments as disclosed herein.

FIG. 11 illustrates another flowchart (1100) of a method of UE for performing the LTM in the wireless network (300) based on the flag, according to the embodiments as disclosed herein. The operations (1102-1114) are handled by the LTM controller (240).

At step 1102, the method includes configuring the flag that indicates whether the UE (200) performs the LTM to complete the LTM or the UE sends the RRCReestablishment during failure. At step 1104, the method includes configuring the first timer for performing the access on the first target candidate cell. At step 1106, the method includes determining the expiry of the first timer, while trying to access the first target candidate cell for completing the LTM. At step 1108, the method includes detecting that the RLF has occurred in the UE (200) based on the determination. At step 1110, the method includes attempting to select the suitable cell for the duration of the second timer and selecting the cell within a second timer value and determining that the suitable cell is the second target candidate cell. At step 1112, the method includes initiating the RRC reestablishment procedure to access the second target candidate cell and indicating in RRCRestablishment message that LTM has failed based on the flag. At step 1114, the method includes completing the LTM by sending the RRCReconfigurationComplete based on the flag.

Figure 12:
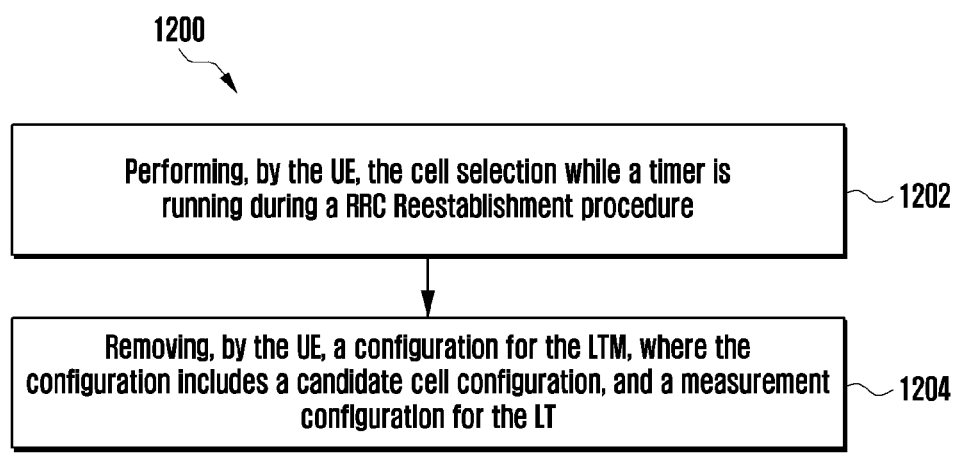
FIG. 12 illustrates another flowchart of a method of UE for performing the LTM in the wireless network, while performing the cell selection and a timer is running according to the embodiments as disclosed herein.

FIG. 12 illustrates another flowchart (1200) of the method of UE for performing the LTM in the wireless network (300), while performing the cell selection and the timer is running, according to the embodiments as disclosed herein. The operations (step 1202 and step 1204) are handled by the LTM controller (240). At step 1202, the method includes performing the cell selection while the timer is running during the RRC Reestablishment procedure. At step 1204, the method includes removing the configuration for the LTM. The configuration includes the candidate cell configuration or measurement configuration for the LTM during the RRC reestablishment procedure.

Figure 13:
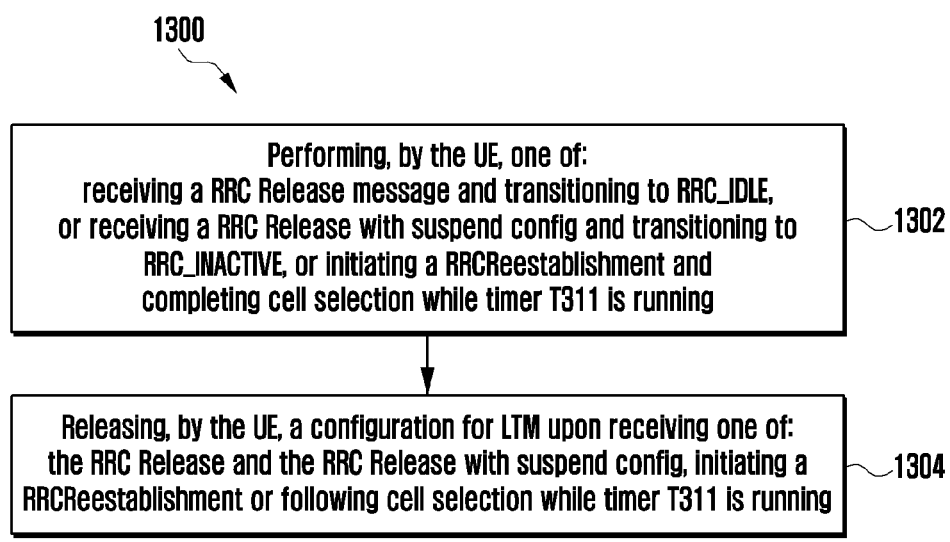
FIG. 13 illustrates another flowchart of a method of UE for performing the LTM in the wireless network according to the embodiments as disclosed herein.

FIG. 13 illustrates another flowchart (1300) of a method of UE for performing the LTM in the wireless network (300), according to the embodiments as disclosed herein. The operations (step 1302 and step 1304) are handled by the LTM controller (240). At step 1302, the method includes performing one of: receiving the RRC release message and transitioning to RRC_IDLE, or receiving the RRC Release with suspend config and transitioning to RRC_INACTIVE, or initiating the RRCReestablishment and completing cell selection while the timer T311 is running. At step 1304, the method includes releasing the configuration for LTM upon receiving one of: the RRC Release and the RRC Release with suspend config, initiating a RRCReestablishment or following cell selection while the timer T311 is running.

Figure 14:
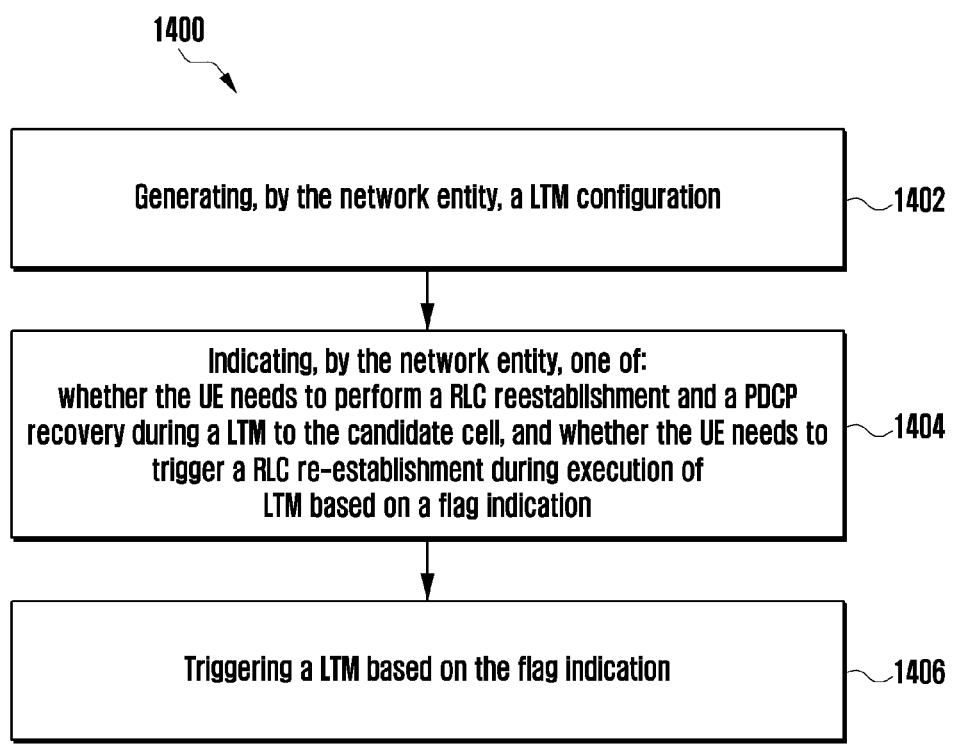
FIG. 14 illustrates a flowchart of a method of network entity for performing the LTM in the wireless network based on a LTM configuration according to the embodiments as disclosed herein.

FIG. 14 illustrates a flowchart (1400) of a method of network entity (100) for performing the LTM in the wireless network (300) based on the LTM configuration, according to the embodiments as disclosed herein. The operations (1402-1406) are handled by the LTM controller (140).

At step 1402, the method includes generating the LTM configuration. At step 1404, the method includes indicating one of: whether the UE (200) needs to perform the RLC reestablishment and the PDCP recovery during the LTM to the candidate cell, and whether the UE (200) needs to trigger the RLC re-establishment during execution of LTM based on the flag indication. At step 1406, the method includes triggering the LTM based on the flag indication.

Figure 15:
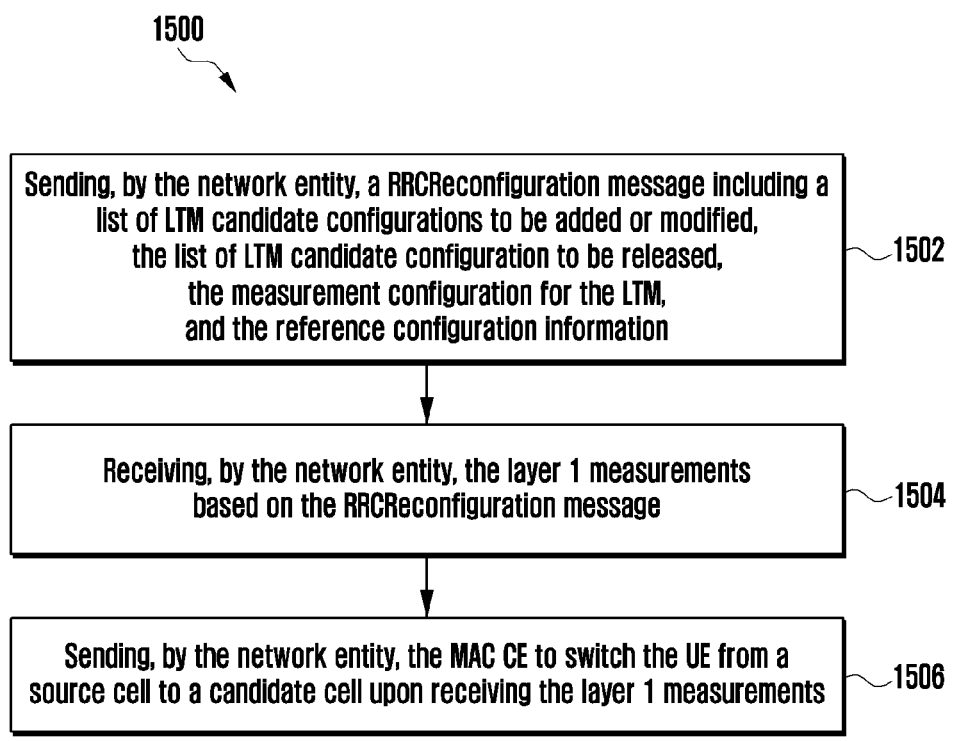
FIG. 15 illustrates a flowchart of a method of network entity for performing the LTM in the wireless network based on the RRCReconfiguration message according to the embodiments as disclosed herein.

FIG. 15 illustrates a flowchart (1500) of a method of network entity (100) for performing the LTM in the wireless network (300) based on the RRCReconfiguration message, according to the embodiments as disclosed herein. The operations (1502-1506) are handled by the LTM controller (140).

At step 1502, the method includes sending the RRCReconfiguration message including the list of LTM candidate configurations to be added or modified, the list of LTM candidate configuration to be released, the measurement configuration for the LTM, and the reference configuration information. At step 1504, the method includes receiving the layer 1 measurements based on the RRCReconfiguration message. At step 1506, the method includes sending the MAC CE to switch the UE (200) from the source cell to the candidate cell upon receiving the layer 1 measurements.

The provided method can be used to avoid data loss and reduce the delay of data recovery in the wireless network.

The various actions, acts, blocks, steps, or the like in the flow charts (800-1500) may be performed in the order presented, in a different order or simultaneously. Further, in some embodiments, some of the actions, acts, blocks, steps, or the like may be omitted, added, modified, skipped, or the like without departing from the scope of the present disclosure.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal, the method comprising:
receiving, from a base station, a control message for a lower layer triggered mobility (LTM) configuration including LTM configuration information, wherein the LTM configuration information includes at least one of first information for releasing at least one LTM candidate cell configuration, second information for adding or modifying at least one LTM candidate cell configuration, or third information on a LTM reference configuration;
identifying whether the first information for releasing the at least one LTM candidate cell configuration is configured, based on the control message; and
performing a LTM candidate cell configuration release based on a LTM candidate identity included in the first information for releasing the at least one LTM candidate cell configuration, in case that the first information for releasing the at least one LTM candidate cell configuration is configured.

2. The method of claim 1, further comprising:
identifying whether the second information for adding or modifying the at least one LTM candidate cell configuration is configured, based on the control message; and
performing a LTM candidate cell configuration addition or modification based on a LTM candidate identity included in the second information for adding or modifying the at least one LTM candidate cell configuration, in case that second information for adding or modifying the at least one LTM candidate cell configuration is configured.

3. The method of claim 1, further comprising:
identifying whether fourth information on a measurement configuration is configured based on the control message; and
performing a measurement configuration procedure based on the fourth information on the measurement configuration, in case that the fourth information on the measurement configuration is configured.

4. The method of claim 1, further comprising:
identifying that a cell selection is triggered based on a LTM cell switch procedure;
identifying whether a selected cell is one of LTM candidate cells based on the control message; and
performing the LTM cell switch procedure for the selected cell, in case that the selected cell is one of LTM candidate cells.

5. The method of claim 4, further comprising:
identifying that a radio resource control (RRC) reestablishment procedure is initiated, based on the selected cell not being one of LTM candidate cells; and
performing an LTM configuration release based on the control message as a response to the identification.

6. The method of claim 1, further comprising:
receiving, from the base station, an RRC release message; and
performing an LTM configuration release based on the reception of the RRC release message.

7. The method of claim 1, wherein the third information on the LTM reference configuration is an octet string including an RRC reconfiguration.

8. A method performed by a base station, the method comprising:
generating a control message for a lower layer triggered mobility (LTM) configuration including LTM configuration information, wherein the LTM configuration information includes at least one of first information for releasing at least one LTM candidate cell configuration, second information for adding or modifying at least one LTM candidate cell configuration, or third information on a LTM reference configuration; and
transmitting, to a terminal, the generated control message, wherein whether the first information for releasing the at least one LTM candidate cell configuration being configured is identified, based on the control message, and
wherein a LTM candidate cell configuration release is performed based on a LTM candidate identity included in the first information for releasing the at least one LTM candidate cell configuration, in case that the first information for releasing the at least one LTM candidate cell configuration is configured.

9. The method of claim 8, further comprising:
transmitting, to a terminal, an RRC release message, wherein an LTM configuration release is performed based on the RRC release message.

10. A terminal comprising:
a transceiver; and
at least one processor operably coupled to the transceiver, the at least one processor configured to:
receive, from a base station via the transceiver, a control message for a lower layer triggered mobility (LTM) configuration including LTM configuration information, wherein the LTM configuration information includes at least one of first information for releasing at least one LTM candidate cell configuration, second information for adding or modifying at least one LTM candidate cell configuration, or third information on a LTM reference configuration,
identify whether the first information for releasing the at least one LTM candidate cell configuration is configured, based on the control message, and
perform a LTM candidate cell configuration release based on a LTM candidate identity included in the first information for releasing the at least one LTM candidate cell configuration, in case that the first information for releasing the at least one LTM candidate cell configuration is configured.

11. The terminal of claim 10, wherein the at least one processor is further configured to:
identify whether the second information for adding or modifying the at least one LTM candidate cell configuration is configured, based on the control message, and
perform a LTM candidate cell configuration addition or modification based on a LTM candidate identity included in the second information for adding or modifying the at least one LTM candidate cell configuration, in case that second information for adding or modifying the at least one LTM candidate cell configuration is configured.

12. The terminal of claim 10, wherein the at least one processor is further configured to:
identify whether fourth information on a measurement configuration is configured based on the control message, and
perform a measurement configuration procedure based on the fourth information on the measurement configuration, in case that the fourth information on the measurement configuration is configured.

13. The terminal of claim 10, wherein the at least one processor is further configured to:
   identify that a cell selection is triggered based on a LTM cell switch procedure,
   identify whether a selected cell is one of LTM candidate cells based on the control message, and
   perform the LTM cell switch procedure for the selected cell, in case that the selected cell is one of LTM candidate cells.

14. The terminal of claim 13, wherein the at least one processor is further configured to:
   identify that a radio resource control (RRC) reestablishment procedure is initiated, based on the selected cell not being one of LTM candidate cells, and
   perform an LTM configuration release based on the control message as a response to the identification.

15. The terminal of claim 10, wherein the at least one processor is further configured to:
   receive, from the base station, an RRC release message, and
   perform an LTM configuration release based on the reception of the RRC release message.

16. The terminal of claim 10, wherein the third information on the LTM reference configuration is an octet string including an RRC reconfiguration.

17. A base station comprising:
   a transceiver; and
   at least one processor operably coupled to the transceiver, the at least one processor configured to:
      generate a control message for a lower layer triggered mobility (LTM) configuration including LTM configuration information, wherein the LTM configuration information includes at least one of first information for releasing at least one LTM candidate cell configuration, second information for adding or modifying at least one LTM candidate cell configuration, or third information on a LTM reference configuration, and
      transmit, to a terminal via the transceiver, the generated control message,
   wherein whether the first information for releasing the at least one LTM candidate cell configuration being configured is identified, based on the control message, and
   wherein a LTM candidate cell configuration release is performed based on a LTM candidate identity included in the first information for releasing the at least one LTM candidate cell configuration, in case that the first information for releasing the at least one LTM candidate cell configuration is configured.

18. The base station of claim 17, wherein the at least one processor is further configured to transmit, to a terminal, an RRC release message, and
   wherein an LTM configuration release is performed based on the RRC release message.

* * * * *